United States Patent
James

(10) Patent No.: US 8,543,771 B1
(45) Date of Patent: Sep. 24, 2013

(54) METHOD FOR MAINTAINING CACHE COHERENCE USING A DISTRIBUTED DIRECTORY WITH EVENT DRIVEN UPDATES

(75) Inventor: David Vernon James, Palo Alto, CA (US)

(73) Assignee: Sawyer Law Group, P.C., Palo Alto, CA (US)

(*) Notice: Subject to any disclaimer, the term of this patent is extended or adjusted under 35 U.S.C. 154(b) by 0 days.

(21) Appl. No.: 13/488,080

(22) Filed: Jun. 4, 2012

Related U.S. Application Data

(62) Division of application No. 11/895,052, filed on Aug. 22, 2007, now Pat. No. 8,195,890.

(60) Provisional application No. 60/839,490, filed on Aug. 22, 2006.

(51) Int. Cl.
G06F 12/00 (2006.01)

(52) U.S. Cl.
USPC ............... 711/141; 711/118; 711/E12.026

(58) Field of Classification Search
None
See application file for complete search history.

(56) References Cited

U.S. PATENT DOCUMENTS

| | | | | |
|---|---|---|---|---|
| 4,695,943 A * | 9/1987 | Keeley et al. | ............. | 711/140 |
| 5,717,916 A | 2/1998 | Verma | | |
| 5,940,856 A * | 8/1999 | Arimilli et al. | ............. | 711/119 |
| 6,065,098 A * | 5/2000 | Lippert | ............. | 711/122 |
| 6,115,804 A * | 9/2000 | Carpenter et al. | ............. | 712/28 |
| 6,154,816 A * | 11/2000 | Steely et al. | ............. | 711/150 |
| 6,226,714 B1 | 5/2001 | Safranek et al. | | |
| 6,374,331 B1 * | 4/2002 | Janakiraman et al. | ......... | 711/141 |
| 6,490,657 B1 * | 12/2002 | Masubuchi et al. | ............. | 711/135 |
| 6,496,907 B1 * | 12/2002 | James | ............. | 711/159 |
| 6,584,550 B1 * | 6/2003 | James | ............. | 711/145 |
| 7,254,806 B1 | 8/2007 | Yates, Jr. et al. | | |
| 7,558,919 B1 | 7/2009 | Yochai et al. | | |
| 2001/0025335 A1 * | 9/2001 | Freerksen et al. | ............. | 711/146 |
| 2004/0162949 A1 * | 8/2004 | Scott et al. | ............. | 711/141 |
| 2004/0205420 A1 * | 10/2004 | Seeley et al. | ............. | 714/57 |
| 2004/0210642 A1 | 10/2004 | Mekkittikul et al. | | |
| 2005/0154805 A1 * | 7/2005 | Steely et al. | ............. | 710/52 |
| 2007/0121499 A1 | 5/2007 | Pal et al. | | |

* cited by examiner

Primary Examiner — Alford Kindred
Assistant Examiner — Daniel Bernard
(74) Attorney, Agent, or Firm — Sawyer Law Group, P.C.

(57) ABSTRACT

The present invention is a protocol for maintaining cache consistency between multiprocessors within a tightly coupled system. A distributed directory is maintained within the data-sharing processors, so that copies can be invalidated when modified. All transfers are event driven, rather the polled, to reduce bus-bandwidth consumption. Deadlocks are avoided by placing to-be-executed command codes in the returned response packets, when the request-forwarding queues are full or not present.

10 Claims, 18 Drawing Sheets

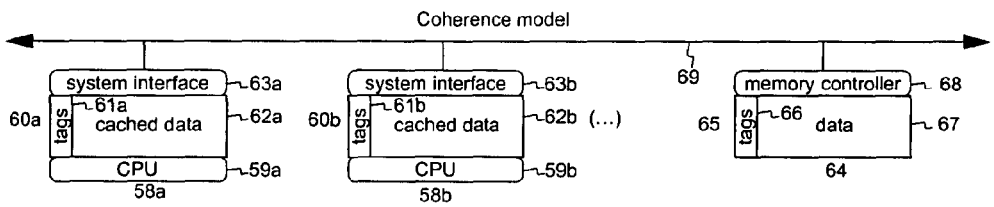
Figure 1
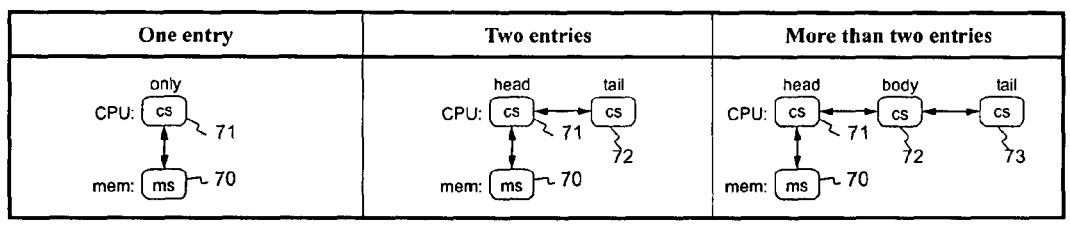
Figure 2
| Type | State | Option | Row | Description |
|---|---|---|---|---|
| I | mU | – | 1 | Memory uncachable. |
| | mI | – | 2 | Memory knows caches are invalid. |
| | mF | – | 3 | Memory inconsistency failure. |
| S | mS | – | 4 | Memory knows caches are shared. |
| M | mM | – | 5 | Memory believes caches could be modified. |
| | mMe | – | 6 | Memory modified, washing failure, to exclusive. |
| | mMs | – | 7 | Memory modified, washing progress, to shared. |
Figure 3

| ClassB | ClassA | States | Row | Description |
|---|---|---|---|---|
| I | I | I | 1 | Invalid; line is available. |
| | F | cF | 2 | Clean-data; fault has occurred. |
| | | dF | 3 | Dirty-data; fault has occurred. |
| | | nF | 4 | No-data; fault has occurred. |
| S | S | cSo | 5 | Clean-data shared only entry. |
| | | nSo | 6 | No-data shared only entry. |
| | Sh | cSh | 7 | Clean-data shared head entry. |
| | | nSh | 8 | No-data shared head entry. |
| | Sb | cSb | 9 | Clean-data shared body entry. |
| | | nSb | 10 | No-data shared body entry. |
| | St | cSt | 11 | Clean-data shared tail entry. |
| | | nSt | 12 | No-data shared tail entry. |
| | Sp | cSp | 13 | Clean-data shared pairwise entry. |
| | | nSp | 14 | No-data shared pairwise entry. |
| | Sq | cSq | 15 | Clean-data shared quidwise entry. |
| | | nSq | 16 | No-data shared quidwise entry. |
| M | Mh | cMh | 17 | Clean-data modifiable head entry. |
| | | dMh | 18 | Dirty-data modifiable head entry. |
| | | nMh | 19 | No-data modifiable head entry. |
| | Mq | cMq | 20 | Clean-data modifiable (head-side copy) quidwise entry. |
| | | dMq | 21 | Dirty-data modifiable (head-side copy) quidwise entry. |
| | | nMq | 22 | No-data modifiable (head-side copy) quidwise entry. |

| ClassB | ClassA | States | Row | Description |
|---|---|---|---|---|
| E | Eo | cEo | 23 | Clean-data exclusive only entry. |
| | | dEo | 24 | Dirty-data exclusive only entry. |
| | | nEo | 25 | No-data exclusive only entry. |
| | | dEi | 26 | Dirty-data exclusive only entry, pairwise likely indication. |
| | Ep | cEp | 27 | Clean-data exclusive (no copy) pairwise entry. |
| | | dEp | 28 | Dirty-data exclusive (no copy) pairwise entry. |
| | | nEp | 29 | No-data exclusive (no copy) pairwise entry. |
| | Eq | cEq | 30 | Clean-data exclusive (no copy) quidwise entry. |
| | | dEq | 31 | Dirty-data exclusive (no copy) quidwise entry. |
| | | nEq | 32 | No-data exclusive (no copy) quidwise entry. |
| N | — | nNp | 33 | No-data unshared pairwise entry. |
| | | nNq | 34 | No-data unshared quidwise entry. |

| Type | State | Row | Description |
|---|---|---|---|
| IX | IH | 1 | Initial invalid-to-head access. |
|  | IB | 2 | Initial invalid-to-body access. |
| SM | SMb | 3 | Shared-to-modifiable upgrade, from body. |
|  | SMt | 4 | Shared-to-modifiable upgrade, from tail. |
| SX | dS0b | 5 | Dirty-data shared body (awaiting invalidation). |
|  | dS0p | 6 | Dirty-data shared pairwise (awaiting touch). |
|  | dS0q | 7 | Dirty-data shared quidwise (awaiting touch). |
|  | dS0t | 8 | Dirty-data shared tail (awaiting invalidation). |
|  | cS1t | 9 | Clean-data shared, toHead=1, tail copy. |
|  | nS1t | 10 | No-data shared, toHead=1, tail copy. |
|  | cS1h | 11 | Clean-data shared, toHead=1, body copy. |
|  | nS1h | 12 | No-data shared, toHead=1, body copy. |
| E1 | cE1 | 13 | Clean/exclusive, toHead=1 (quidwise copy). |
|  | dE1 | 14 | Dirty/exclusive, toHead=1 (quidwise copy). |
|  | nE1 | 15 | No-data/exclusive, toHead=1 (quidwise copy). |
| N0 | dN0 | 16 | Dirty no-data only entry, awaiting deletion. |
|  | dN0p | 17 | Dirty no-data pairwise entry, awaiting deletion. |
|  | dN0q | 18 | Dirty no-data quitwise entry, awaiting deletion. |
|  | dN0t | 19 | Dirty no-data tail entry, awaiting deletion. |

Figure 5

| Type | Name | Row | Description |
|---|---|---|---|
| prepends | mNaRead | 1 | Memory uncached all-bytes read. |
| | mNbRead | 2 | Memory uncached selected-bytes read. |
| | mNaWrite | 3 | Memory uncached all-bytes write. |
| | mNbWrite | 4 | Memory uncached selected-bytes write. |
| | mNaClear | 5 | Memory uncached all-bytes clear. |
| | mNbClear | 6 | Memory uncached selected-bytes clear. |
| | mNnClear | 7 | Memory uncached no-bytes clear. |
| | mNaSwap | 8 | Memory uncached all-bytes swap. |
| | mNbSwap | 9 | Memory uncached selected-bytes swap. |
| | mEcRead | 10 | Memory exclusive clean read. |
| | mEcMark | 11 | Memory exclusive clean mark. |
| | mEdRead | 12 | Memory exclusive dirty read. |
| | mEdMark | 13 | Memory exclusive dirty mark. |
| | mMcRead | 14 | Memory modifiable clean read. |
| | mMdRead | 15 | Memory modifiable dirty read. |
| | mSeRead | 16 | Memory shared-or-exclusive read. |
| | mScRead | 17 | Memory shared-clean read. |
| | mSdRead | 18 | Memory shared-dirty read. |
| | mSsRead | 19 | Memory shared-shared read. |
| upgrade | mCuMark | 20 | Memory cached upgrade mark. |
| | mCuRead | 21 | Memory cached upgrade read. |
| deletions | mCnMark | 22 | Memory cached next-update mark. |
| | mChMark | 23 | Memory cached return-home mark. |
| | mChWrite | 24 | Memory cached return-home write. |
| reflective | mTnRead0 | 25 | Memory through unrestricted read, part 0. |
| | mTsRead0 | 26 | Memory through shared-restricted read, part 0. |
| | mTnWrite1 | 27 | Memory through unrestricted write, part 1. |
| washing | mTwRead0 | 28 | Memory through washing read, part 0. |
| | mTwMark1 | 29 | Memory through washing mark, part 1. |
| | mTwWrite1 | 30 | Memory through washing write, part 1. |

Figure 8

| GroupC | GroupC | GroupB | GroupA | Name | Option | Row | Description |
|---|---|---|---|---|---|---|---|
| dxXxFetch | dsXxFetch | — | *dsXxRead* | dsSsRead | — | 1 | Directive shared shared stable read. |
| dxXxFetch | dsXxFetch | | | dsMcRead | — | 2 | Directive shared modifiable clean-owned read. |
| dxXxFetch | dsXxFetch | | | dsEcRead | — | 3 | Directive shared modifiable exclusive read. |
| dxXxFetch | dsXxFetch | — | dsXxMark1 | dsSsMark1 | — | 4 | Directive shared shared stable mark. |
| dxXxFetch | dsXxFetch | | | dsTcMark1 | — | 5 | Directive shared toss clean-owned mark. |
| dxXxFetch | dnXxFetch | — | dnSxRead | dnSsRead | — | 6 | Directive unshared shared stable read. |
| dxXxFetch | dnXxFetch | | | dnSwRead | — | 7 | Directive unshared shared washing read. |
| dxXxFetch | dnXxFetch | dnMxFetch | dnMxRead | dnMcRead | — | 8 | Directive unshared modifiable clean read. |
| dxXxFetch | dnXxFetch | dnMxFetch | | dnMdRead | — | 9 | Directive unshared modifiable dirty read. |
| dxXxFetch | dnXxFetch | dnMxFetch | dnExRead | dnEcRead | — | 10 | Directive unshared exclusive-clean read. |
| dxXxFetch | dnXxFetch | dnMxFetch | | dnEdRead | — | 11 | Directive unshared exclusive-dirty read. |
| dxXxFetch | dnXxFetch | dnMxFetch | dnExMark | dnEcMark | — | 12 | Directive unshared exclusive-clean mark. |
| dxXxFetch | dnXxFetch | dnMxFetch | | dnEdMark | — | 13 | Directive unshared exclusive-clean mark. |
| — | — | — | — | dsSsPoke | — | 14 | Directive shared stable poke. |
| deXxMarkX | — | — | — | deTcMark | — | 15 | Directive extended toss clean mark. |
| deXxMarkX | — | deXcMarkN | dePcMarkN | dePcMark0 | — | 16 | Directive extended plus clean mark, part-0. |
| deXxMarkX | — | deXcMarkN | | dePcMark1 | — | 17 | Directive extended plus clean mark, part-1. |
| deXxMarkX | — | deXcMarkN | deTcMarkN | deTcMark0 | — | 18 | Directive extended toss clean mark, part-0. |
| deXxMarkX | — | deXcMarkN | | deTcMark1 | — | 19 | Directive extended toss clean mark, part-1. |

Figure 9

| Type | GroupC | GroupB | GroupA | Name | Row | Description |
|---|---|---|---|---|---|---|
| revision | — | ccX1Fetch | ccTnFetch | ccTnRead | 1 | Cache-to-cache tail uncached read. |
| | | | | ccTnMark | 2 | Cache-to-cache tail deletion mark. |
| | | | — | ccB1Mark | 3 | Cache-to-cache body part-1 deletion mark. |
| | | ccX0Fetch | ccB0Fetch | ccB0Read | 4 | Cache-to-cache body part-0 deletion read. |
| | | | | ccB0Mark | 5 | Cache-to-cache body part-0 deletion mark. |
| | | | — | ccH0Mark | 6 | Cache-to-cache head part-0 deletion mark. |
| | — | — | | ccH1Mark | 7 | Cache-to-cache head part-1 deletion mark. |
| | | | ccTdMarkN | ccTdMark0 | 8 | Cache-to-cache touch dirty mark, part-0. |
| | | | | ccTdMark1 | 9 | Cache-to-cache touch dirty mark, part-1. |
| pairwise | cpXxxXxx | cpXxFetch | cpXaRead | cpSaRead | 10 | Cache pairwise share all bytes read. |
| | | | | cpNaRead | 11 | Cache pairwise uncached all bytes read. |
| | | | cpXeFetch | cpMcRead | 12 | Cache pairwise modified clean read. |
| | | | | cpEcRead | 13 | Cache pairwise exclusive clean read. |
| | | | | cpEcMark | 14 | Cache pairwise exclusive clean mark. |
| | | | | cpMdRead | 15 | Cache pairwise modified dirty read. |
| | | | | cpEdRead | 16 | Cache pairwise exclusive dirty read. |
| | | | | cpEdMark | 17 | Cache pairwise exclusive dirty mark. |
| | | — | | cpTnMark | 18 | Cache pairwise touch undirty mark. |
| special | — | — | — | ccPokeWake | 19 | Wakeup of the head-side entry. |
| internal | — | — | — | ccWbPost | 20 | Wakeup of the tail-side entry. |
| | | | | ccWfPost | 21 | Wakeup of the head-side entry. |

Figure 10

| Type | Name | Option | Row | Description |
|---|---|---|---|---|
| deferred | sDataLast | – | 1 | Completion deferred, no copies remaining. |
| | sDataMore | – | 2 | Completion deferred, some copies remaining. |
| | sDataSMore | – | 3 | Completion deferred, shared copies remaining. |
| | sDataEcPair | – | 4 | Completion deferred, shared copies remaining. |
| | sDataMcPair | – | 5 | Completion deferred, shared copies remaining. |
| partial | sDataLast0 | – | 6 | Clean partial confirmation, no copies remain. |
| | sDataMLast0 | – | 7 | Dirty partial confirmation, no copies remain. |
| | sDataSLast0 | – | 8 | Shared partial confirmation, no copies remain. |
| | sDataMore0 | – | 9 | Clean partial confirmation, copies could remain. |
| | sDataMMore0 | – | 10 | Modified partial confirmation, copies could remain. |
| | sDataSMore0 | – | 11 | Shared partial confirmation, copies could remain. |
| | sDataEcPair0 | – | 12 | Clean completion, no copy remains. |
| | sDataEdPair0 | – | 13 | Modified completion, no copy remains. |
| | sDataMcPair0 | – | 14 | Clean completion, a copy remains. |
| | sDataMdPair0 | – | 15 | Modified completion, a copy remains. |
| complete | sDataDone2 | – | 16 | Completion confirmation. |
| | sDataHome2 | – | 17 | Completion, not a sharing-list entry. |
| | sDataLast2 | – | 18 | Clean completion, no copies remain. |
| | sDataMLast2 | – | 19 | Dirty completion, no copies remain. |
| | sDataSLast2 | – | 20 | Shared completion, no copies remain. |
| | sDataMore2 | – | 21 | Clean completion, more copies remain. |
| | sDataMMore2 | – | 22 | Modified completion, more copies remain. |
| | sDataSMore2 | – | 23 | Shared completion, more copies remain. |
| | sDataBLast2 | – | 24 | Shared tail completion, no copies remain. |
| | sDataBMore2 | – | 25 | Shared body completion, more copies remain. |
| | sDataEcPair2 | – | 26 | Clean completion, no copy remains. |
| | sDataEdPair2 | – | 27 | Modified completion, no copy remains. |
| | sDataMcPair2 | – | 28 | Clean completion, a copy remains. |
| | sDataMdPair2 | – | 29 | Modified completion, a copy remains. |

Figure 11

| Subaction | Name | Option | Row | Description |
|---|---|---|---|---|
| abnormal | sVoidFault0 | – | 1 | Fatal access condition. |
| | sVoidFault1 | – | 2 | |
| | sVoidFault2 | – | 3 | |
| | sVoidBad2 | – | 4 | Unsupported access. |
| deferred | sVoidDone | – | 5 | Completion deferred. |
| | sVoidLast | – | 6 | Completion deferred, no copies remaining. |
| | sVoidMore | – | 7 | Completion deferred, some copies remaining. |
| | sVoidEcPair | – | 8 | Completion deferred, shared copies remaining. |
| | sVoidMcPair | – | 9 | Completion deferred, shared copies remaining. |
| internal | sVoidCode0 | – | 10 | Dummy status parameter, part-0. |
| | sVoidCode1 | – | 11 | Dummy status parameter, part-1. |
| partial | sVoidLast0 | – | 12 | Completion, none remaining. |
| | sVoidMore0 | – | 13 | Owned completion, some remaining. |
| | sVoidEcPair0 | – | 14 | Clean completion, no copy remains. |
| | sVoidEdPair0 | – | 15 | Modified completion, no copy remains. |
| | sVoidDone1 | – | 16 | Completion. |
| | sVoidLast1 | – | 17 | Completion, none remaining. |
| | sVoidMore1 | – | 18 | Completion, more remaining. |
| | sVoidDone2 | – | 19 | Something completed. |
| | sVoidHome2 | – | 20 | No longer listed. |
| | sVoidLast2 | – | 21 | None remaining. |
| | sVoidMLast2 | – | 22 | Modified, none remaining. |
| | sVoidNone2 | – | 23 | Body-deletion state, final-phase deferred. |
| | sVoidNope2 | – | 24 | Body-deletion state, first-phase deferred. |
| complete | sVoidEcPair2 | – | 25 | Clean completion, no copy remains. |
| | sVoidEdPair2 | – | 26 | Modified completion, no copy remains. |
| special | sPokeWake | – | 27 | Wakeup a sleeping entry. |

Figure 12

| Inputs | | Options | Row | Output |
|---|---|---|---|---|
| resp0 | resp1 | | | resp2 |
| sDataMore0 | sVoidLast1 | – | 1 | sDataLast2 |
| sDataLast0 | sVoidLast1 | – | 2 | |
| sDataLast | sVoidLast1 | – | 3 | sDataLast |
| sDataLast | sVoidCode | – | 4 | |
| sDataLast0 | sVoidDone1 | – | 5 | sDataPLast2 |
| sDataSMore0 | sVoidLast1 | – | 6 | sDataSLast2 |
| sDataMore0 | sVoidDone1 | – | 7 | sDataMore2 |
| sDataMore0 | sVoidMore1 | – | 8 | |
| *sDataMore0* | *sVoidCode1* | – | 9 | |
| sDataSMore0 | sVoidDone1 | – | 10 | sDataSMore2 |
| sDataSMore0 | sVoidMore1 | – | 11 | |
| sDataMore0 | sVoidCode | – | 12 | sDataMore |
| sDataMore | sVoidCode | – | 13 | |
| sDataSMore0 | sVoidCode | – | 14 | sDataSMore |
| sDataEcPair0 | sVoidDone1 | – | 15 | sDataEcPair2 |
| sDataEdPair0 | sVoidDone1 | – | 16 | sDataEdPair2 |
| sDataMcPair0 | sVoidDone1 | – | 17 | sDataMcPair2 |
| sDataMdPair0 | sVoidDone1 | – | 18 | sDataMdPair2 |
| sVoidCode0 | sVoidDone1 | – | 19 | sVoidDone2 |
| sVoidDone2 | sVoidCode | – | 20 | |
| sVoidCode0 | sVoidLast1 | – | 21 | sVoidLast2 |
| sVoidLast0 | sVoidLast1 | – | 22 | |
| sVoidLast | sVoidCode | – | 23 | sVoidLast |
| sVoidMore | sVoidCode | – | 24 | sVoidMore |
| sVoidEcPair0 | sVoidDone1 | – | 25 | sVoidEcPair2 |
| sVoidEdPair0 | sVoidDone1 | – | 26 | sVoidEdPair2 |

| Inputs | | Options | Row | Output |
|---|---|---|---|---|
| resp0 | resp1 | | | resp2 |
| sVoidFault0 | sVoidCode1 | – | 27 | sVoidFault2 |
| | sVoidCode1<br>sVoidDone1<br>sVoidLast1<br>sVoidMore1<br>sVoidFault1 | – | 28 | |
| sVoidCode0 | sVoidFault1 | – | 29 | |
| sDataMore0<br>sDataSMore0<br>sDataLast0<br>sDataMLast0<br>sDataSLast0<br>sVoidLast0<br>sVoidMore0 | sVoidFault1 | – | 30 | |

| Initial states | Intermediate actions | Final states |
|---|---|---|
| I, nSo, mM  Row a | IH, mMs with arrows 1,2,3,4,5 | Sh → St, → mS |
| I, nSo, mM  Row b | IH, mMs with arrows 1,2,3  b1 | IH, mMs  b2 |
| | IH, — with arrows 10, 11  b3 | IH, mMe  b4 |
| | IH, mMe with arrows 4, 5  b5 | cMh → cSt, → mM  b6 |

Figure 21

METHOD FOR MAINTAINING CACHE COHERENCE USING A DISTRIBUTED DIRECTORY WITH EVENT DRIVEN UPDATES

CROSS-REFERENCE TO RELATED APPLICATIONS

Under 35 U.S.C. 120, this application is a Divisional Application and claims the benefit of U.S. application Ser. No. 11/895,052, filed Aug. 22, 2007, now U.S. Pat. No. 8,195,890 entitled "METHOD FOR MAINTAINING CACHE COHERENCE USING A DISTRIBUTED DIRECTORY WITH EVENT DRIVEN UPDATES," which claims the benefit of U.S. Provisional Application No. 60/839,490, filed Aug. 22, 2006, entitled "METHOD FOR MAINTAINING CACHE COHERENCE USING A DISTRIBUTED DIRECTORY WITH EVENT DRIVEN UPDATES," all of which are incorporated herein by reference.

FIELD OF THE INVENTION

The present invention is directed to a protocol for maintaining cache consistency between multiprocessors within a tightly coupled system.

BACKGROUND OF THE INVENTION

As processor performance continues to increase, the latency of a processor's access of a remote memory location continues to increase beyond the latency of a processor's access of local memory.

Processor caches are a way of reducing the average memory access time, by saving copies of frequently used memory addresses in processor-resident storage locations. The locality of memory references over time (temporal locality) and space (spatial locality) allows the cache to fulfill most memory accesses, so that the longer latencies associated with remote-location memory are effectively reduced.

Within a multiprocessor system, each processor may have its own cache. Multiple copies of the same data may be cached concurrently within several or all of these processors. To maintain a consistent view of addressable memory, all such copies must be equal. Maintaining equal copies of cached data values within multiprocessor caches is the responsibility of cache coherence protocols.

For simplicity, the cache coherence protocols track the state and presence of equal-sized collections of data bytes, called a line, rather than individual data bytes. A larger line reduces the overhead of including a header (containing command and address information) with every data packet transferred on the system interconnect, as well as other tracking information possibly associated with each line. The number of data bytes within each line is typically 64 bytes, although smaller (32 bytes) and larger (128 bytes or 256 bytes) numbers of data bytes within each line are possible.

The most common way to maintain cache coherence between multiprocessors relies on broadcasting writes (or intents to write) from processors, wherein a write to a line address by one processor (called the owner) is broadcast to others for the purpose of invalidating other cached copies of the same line address. On large multiple-bus or mesh connected multiprocessor systems, such broadcasts are inefficient in that their propagation consumes interconnect bandwidth to each potential processor cache, regardless of the number of actual processor-cache resident copies.

The intent of these broadcasts is to distribute invalidate messages to other caches, which then have the opportunity to check their caches for a matching-address line, a process called snooping. Other caches with shared clean copies are responsible for invalidating their copies, so that their copies will remain consistent after the owner's write is performed. Another cache with a dirty copy is responsible for providing that data to the new owner, so that the write effects the most recently modified data, rather than a stale copy obtained from memory.

Snooping-based cache protocols are inefficient on multiple-bus or multiple-link interconnects, since broadcasting of snoop information reduces the performance of the interconnect to that of a single shared bus. A preferred alternative is to restricting of snoop information to only those caches that have a copy of the line address. This requires retaining information that identifies which caches have (or are likely to have) shared copies, on an addressable-line basis. Cache coherence protocols that retain such copy-location information are called directory-based cache coherence protocols.

Central-directory cache-coherence protocols rely on bits within the memory controller (or a cached version of memory) to identify each of the possible shared-copy locations. Such simple protocols are sufficient to support small multiprocessor systems, since the overhead of these bits is small compared to the memory line size. Special/complex adaptations (such as reassociating bits with processor-cache clusters) are required to support larger multiprocessor system or even small multiprocessor systems with large numbers of possible cache addresses.

Distributed-directory cache-coherence protocols rely on a pointer within the memory controller (or a cached shared cache) to identify the first of many possible shared-copy locations. Each shared-copy location has state to identify additional shared copies, typically through a singly-linked lists, a doubly-linked list, or binary-tree structures.

An instance of a distributed-directory cache-coherence protocols is the cache coherence protocol specified by IEEE Std 1596 Scalable Coherent Interface. This specification assumes the presence of memory tags to identify the first cache location (the head of the list); shared copies are found by walking the doubly-linked list from the head. A distinct list is maintained for each possible memory-line address.

SUMMARY OF THE INVENTION

The present invention is a protocol for maintaining cache consistency between multiprocessors within a tightly coupled system. A distributed directory is maintained within the data-sharing processors, so that copies can be invalidated when modified. All transfers are event driven, rather the polled, to reduce bus-bandwidth consumption. Deadlocks are avoided by placing to-be-executed command codes in the returned response packets, when the request-forwarding queues are full or not present.

BRIEF DESCRIPTION OF DRAWINGS

FIG. 1 is an illustration of a simple multiprocessor system.

FIG. 2 is an illustration of logical links between a memory line and cached multiprocessor copies.

FIG. 3 lists the states possible within any coherent memory line.

FIG. 4 lists the stable states possible within a coherent cache line.

FIG. 5 lists the unstable states possible within any coherent memory line.

FIG. 8 lists the possible command codes in packets sent to the memory controller.

FIG. 9 lists the possible command codes in packets that are directed to other caches.

FIG. 10 lists the possible cache-command codes that are sent between caches.

FIG. 11 lists the possible data-present status codes that are returned to a requester.

FIG. 12 lists the possible data-absent cache-command codes that returned to a requester.

FIG. 13 lists the status code produced as a result of combining two distinct status codes.

FIG. 21 illustrates the packet sequence for washing a modified sharing list, changing it state to shared.

DETAILED DESCRIPTION

Figure 6:
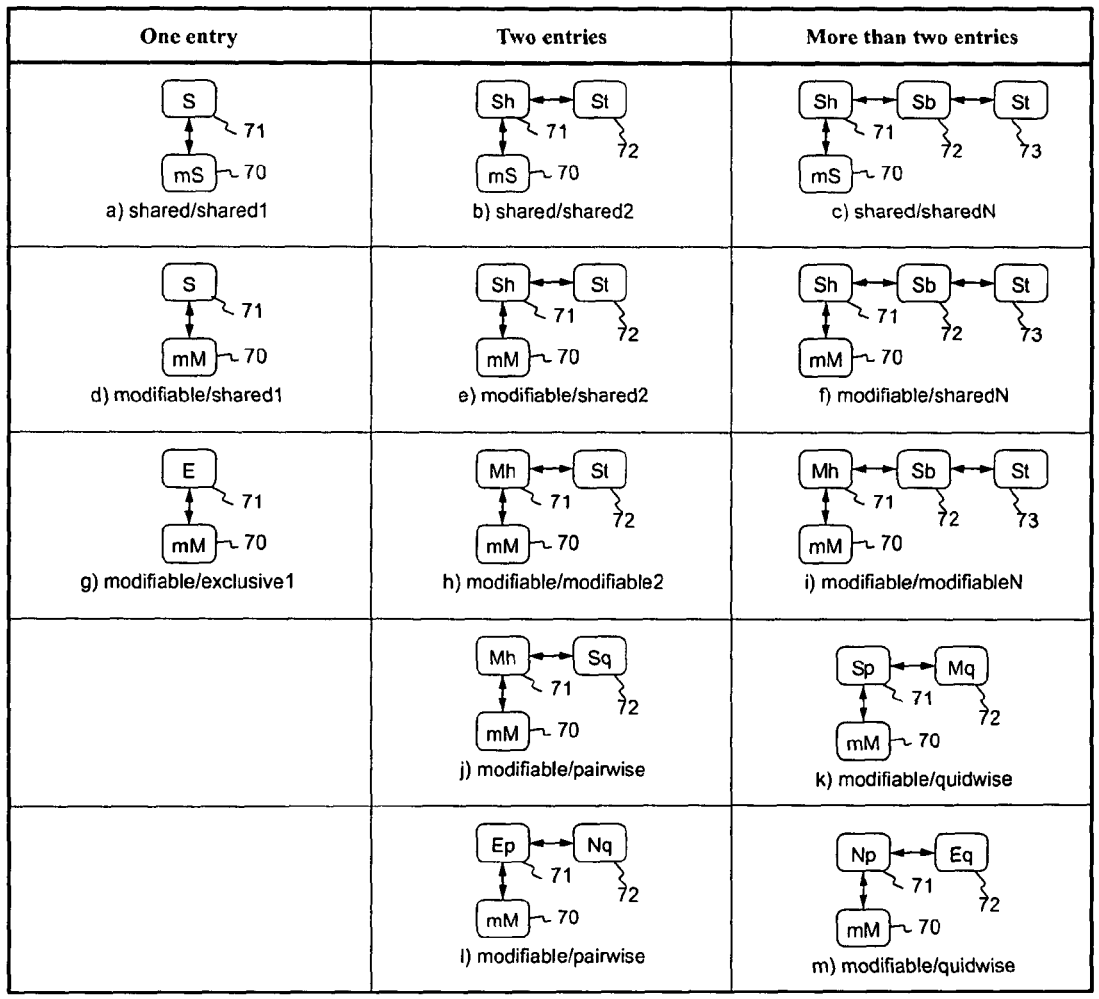
FIG. 6 illustrates the possible sharing-list structures.

The present invention is directed to a protocol for maintaining cache consistency between multiprocessors within a tightly coupled system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features herein.

Referring to FIG. 1, a typical collection of cache-coherent multiprocessors is illustrated. Multiprocessors 58a and 58b are connected to memory controller 64 through system interconnect 69. The system interconnect 69 supports transfers of request and response packets. While illustrated as a bus-like double-arrow line, ring or mesh interconnections are expected to be utilized in higher performance applications.

The interconnect 69 has no need to support broadcast and/or snoop capabilities; only directed (one source to one target) request and response packet deliveries are required. To avoid deadlocks, the interconnect 69 is designed to ensure the successful forwarding of a response packet is not dependent on the completion of any concurrently-active request packet.

Multiprocessors 58a and 58b have caches 60a and 60b that provide data requested by the CPU units 59a and 59b. Caches 60a and 60b are also connected to the system interconnect 69, so they can fetch data (when needed by their attached CPU units) or provide data (when needed by other CPU units). Although only two multiprocessors are illustrated, one skilled in the art would understand that the number of multiprocessors could be larger.

Cache 60a comprises tags 61a and cached data 62a. Cached data is organized in chunks called lines, where each line typically comprises 64 data bytes. Each of these lines, or small collections of lines, has associated tag storage that provides state information (to indicate when the cached-data is valid) as well as coherence maintenance fields. Cache 60b has similar tags 61b and cached data 62b.

Memory 64 comprises memory controller 68 and data storage 65. Memory storage is organized in chunks called lines, where each line typically comprises 64 data bytes. Each of these lines, or small collections of lines, has associated tag storage that provides state information (to indicate when the cached-data is valid) as well as coherence maintenance fields. For simplicity, the size of lines in processor caches 60a and 60b are typically the same size as the lines in memory data storage 65.

Referring to FIG. 2, possible sharing-list structures are shown. A distinct sharing list structure is possible for each line address, based on the memory-tag and cache-tag state associated with the particular line address. Double arrows illustrate links that are specified at both sides of the link, by index values that serve as pointers by identifying the physical location associated with the other linked entity.

Referring to the left cell of FIG. 2, the memory line 70 has a tag that identifies the cache line 71; the cache line 71 has a tag that identifies the memory line 70, as illustrated on the left cell of FIG. 2. The pointer within memory line 70 allows the memory to redirect accesses from other caches to the current cache line 71. The pointer within cache line 71 allows the cache to inform memory line 70 when its cache-line storage is recycled in favor of a more-recently accessed line address.

The state of the memory line, illustrated as 'ms', allows the memory controller to determine whether the current data is shared (and can be freely distributed to others as read-only data) or modifiable (and possibly modified data must be fetched from cache). In a similar fashion, the 'cs' state of each sharing-list cache specifies the data-access rights (read-only, read/write, etc.) as well as the cache line's sharing-list position (only-entry, head, body, or tail).

Referring to the center cell of FIG. 2, the memory line 70 and cache line 71 have tags that identify each others. Cache line 71 and cache line 72 also have tags that identify each other. In this case, pointers within cache line 71 and cache line 71 allows each cache to inform the other when its cache-line storage is recycled in favor of a more-recently accessed line address.

Referring to the right cell of FIG. 2, the memory line 70, cache line 71, cache line 72, and cache line 73 have tags that identify each others. In this case, pointers within cache line 71, cache line 72, and cache line 73 allows each cache to inform the other when its cache-line storage is recycled in favor of a more-recently accessed line address.

To better understand the use of possible states within memory and cache lines, a possible set of memory-line and cache-line states are specified.

Referring now to FIG. 3, a list of possible memory states (located within memory tags 65) is provided. For convenience in later illustrations, acronym-like abbreviations (as opposed to full names) are used to describe the states, in this and following tables. The underlined characters in the description indicate the textual meaning of the abbreviated state names.

The 'mU' state indicates no cache copies are present and (due to limitations of that addressable address) none of the other states can be supported. The state 'mI' indicates no cache copies are present. The state 'mS' indicates that one or more shared (read-only) cached copies are present.

The state 'mM' indicates a modifiable copy can be present and (depending on the sharing-list structure) multiple read-only shared copies may be present. The term modifiable implies the list owner can modify the data without communicating to memory, although other sharing-list copies must be invalidated.

There are two transitional variants of the 'mM' state, that facilitate the conversion of the memory-line state from 'mM' to 'mS', through a process called washing, as follows:

'mMs'—The cache line is partially successful in its transition from mM-to-mS.

'mMe'—The cache line has been unsuccessful in its transition from mM-to-mS.

Referring now to FIG. 4, the set of stable coherent cache states is shown under the "States" column. Most stable cache-line states have the format 'aBc', where the meaning of these three format characters is listed below:

a—Identifies the associated-data property and is any of:
c: Clean data
d Dirty data
n: No data
B—Identifies the access-rights property and is any of:
F: Fault: An state inconsistency (indicative of a hardware failure) was detected.
I: Invalid: The line has no valid data or tags and is not present in the sharing list.
S: Shared: The read-only data may be present in other sharing-list copies.
M: Modifiable: The data may be modified after invalidating other sharing-list copies.
E: Exclusive: The data may be modified after invalidating other sharing-list copies
c—Identifies the sharing-list position and is any of:
o: only list entry
h: head-of-list
b: body-of-list
t: tail-of-list
p: pairwise-list head
q: pairwise-list tail (nicknamed quid)

These states are loosely classified into four classB categories, as follows:
I Invalid: memory must be accessed to obtain valid data.
S Shared: Read-only data is (or was previously) present.
M Modifiable: Data can be modified without informing memory.
E Exclusive: Data can be modified without informing memory or sharing-list copies.
N Null: Data is not accessible, although the sharing-list position is maintained.

These states are classified into classA categories (listed in the classA column) when the associated-data property distinction (represented by the first character of the 'aBc' naming convention) is not significant and therefore can be ignored. The state and classA names are used interchangeably within following figures, when the associated-data property is significant or insignificant respectively.

These states are more-loosely classified into classB categories (listed in the classA column) when the associated-data property distinction (represented by the first character of the 'aBc' naming convention) and the sharing-list position (represented by the last character of the 'aBc' naming convention) are neither significant and both can therefore be ignored.

The 'I' state indicates the line has no valid cached-tag or cached-data components and is not present in the sharing list.

The 'cF' state indicates cached data is present and the same as memory, and a state inconsistency (indicative of a hardware failure) was detected. The 'dF' state indicates cached data is present but possibly different from memory, and a state inconsistency (indicative of a hardware failure) was detected. The 'nF' state indicates cached data is absent, and a state inconsistency (indicative of a hardware failure) was detected.

The 'cSo' state indicates cached read-only same-as-memory data is present and this is the only sharing-list entry. The 'nSo' state is like the 'cSo' state, but no data is present. A line with a tag state of 'cSo' can quietly transition to 'nSo' when the line's data storage associated with the line is needed for other purposes. The term quietly implies that no communications with memory or other sharing-list copies are necessary.

The 'cSh' state indicates a sharable read-only cache copy is present, the copy is doubly-linked to memory, and at least one other sharing-list copy is present. The 'nSh' state is like the 'cSh' state, but no data is present. A line with a tag state of 'cSh' can quietly transition to 'nSh' when the line's data storage associated with the line is needed for other purposes.

The 'cSb' state indicates a sharable read-only cache copy is present, the copy is doubly-linked to two cached copies, and thus at least three sharing-list copies are present. The 'nSb' state is like the 'cSb' state, but no data is present. A line with a tag state of 'cSb' can quietly transition to 'nSb' when the line's data storage associated with the line is needed for other purposes.

The 'cSt' state indicates a sharable read-only cache copy is present, the copy is doubly-linked to one sharing-list copy, and thus at least two sharing-list copies are present. The 'nSt' state is like the 'cSt' state, but no data is present. A line with a tag state of 'cSt' can quietly transition to 'nSt' when the line's data storage associated with the line is needed for other purposes.

The 'cMh' state indicates a clean-modifiable cache copy is present, the copy is doubly-linked to memory and one sharing-list copy, and thus at least one two sharing-list copies are present. The 'dMh' state is like the 'cMh' state, but the data is dirty and therefore must eventually be written back to memory. The 'nMh' state is like the 'cMh' state, but no data is present. A line with a tag state of 'cMh' can quietly transition to 'nMh' when the line's data storage associated with the line is needed for other purposes.

The 'cMq' state indicates a clean-modifiable cache copy is present, the copy is doubly-linked to one sharing-list copy, and thus at least one two sharing-list copies are present. The 'dMp' state is like the 'cMp' state, but the data is dirty and therefore must eventually be written back to memory. The 'nMp' state is like the 'cMp' state, but no data is present. A line with a tag state of 'cMp' can quietly transition to 'nMp' when the line's data storage associated with the line is needed for other purposes.

The 'cEo' state indicates a single clean-modifiable cache copy is present and no other sharing-list copies are present. The 'dEo' state is like the 'cEo' state, but the data is dirty and therefore must eventually be written back to memory. The 'dEi' state is like the 'dEo' state, but an indication is provided to facilitate a sharing-list extension when the line is accessed by another processor. The 'nEo' state is like the 'cEo' state, but no data is present. A line with a tag state of 'cEo' can quietly transition to 'nEo' when the line's data storage associated with the line is needed for other purposes.

The 'cEp' state indicates a single clean-modifiable cache copy is present, the copy is doubly-linked to memory and one sharing-list copy, and thus at least one two sharing-list copies are present. The 'dEp' state is like the 'cEp' state, but the data is dirty and therefore must eventually be written back to memory. The 'nEp' state is like the 'cEp' state, but no data is present. A line with a tag state of 'cEp' can quietly transition to 'nEp' when the line's data storage associated with the line is needed for other purposes.

The 'cEq' state indicates a single clean-modifiable cache copy is present, the copy is doubly-linked to one sharing-list copy, and thus at least one two sharing-list copies are present. The 'dEq' state is like the 'cEq' state, but the data is dirty and therefore must eventually be written back to memory. The 'nEq' state is like the 'cEq' state, but no data is present. A line with a tag state of 'cEq' can quietly transition to 'nEq' when the line's data storage associated with the line is needed for other purposes.

The 'nNp' state indicates no cached copy is present, the copy is doubly-linked to memory and one sharing-list copy, and thus at least one two sharing-list copies are present. The other sharing-list entry is thought to be in one of the 'cEq', 'dEq', or 'nEq' states.

The 'nNq' state indicates no cached copy is present, the copy is doubly-linked to one sharing-list copy, and thus at least one two sharing-list copies are present. The other sharing-list entry is thought to be in one of the 'cEp', 'dEp', or 'nEp' states.

Referring now to FIG. 5, the set of unstable coherent cache states are shown under the "States" column. Unstable cache-line states have the format 'aBDc', where the meaning of leading and trailing characters is the same for stable and unstable cache-line states.

The 'IH' state indicates an in-progress locally-triggered transition between the 'I' state and one of the sharing-list head (S, Sh, Mh, Eo, or Ep) states. The 'IB' state indicates an in-progress locally-triggered transition between the 'I' state and the sharing-list body (Sb) state. The term locally-triggered implies the state change was initiated by the local CPU, with the intent of changing the current cache-line state.

The 'SMb' state indicates an in-progress locally-triggered transition between an 'Sb' state and one of the modifiable sharing-list head (Mh, Eo, or Ep) states. The 'SMt' state indicates an in-progress locally-triggered transition between an 'St' state and one of the modifiable sharing-list head (Mh, Eo, or Ep) states.

The 'dS0b' state indicates an in-progress locally-triggered transition between an 'dMh' state and the sharing-list body S state. The 'S0p' state indicates an in-progress locally-triggered transition between an 'dMh' state and the pairwise cSp state. The 'dS0q' state indicates an in-progress locally-triggered transition between an 'dMq' state and the pairwise cSq state. The 'dS0t' state indicates an in-progress locally-triggered transition between an 'dEo' state and either of the 'cSt' or 'I' states.

The 'cS1t' state indicates an in-progress remotely-triggered transition between 'cSt' and 'cSo' states. The 'nS1t' state indicates an in-progress remotely-triggered transition between 'nSt' and 'nSo' states. The 'cS1h' state indicates an in-progress remotely-triggered transition between 'cSb' and 'cSh' states. The 'nS1 h' state indicates an in-progress remotely-triggered transition between 'nSb' and 'nSh' states. The term remotely-triggered implies the state change was initiated by the receipt of a request packet sent from a different CPU, with the intent of changing the cache-line state in the different CPU.

The 'cE1' state indicates an in-progress remotely-triggered transition between 'cEq' and 'cEo' states. The 'dE1' state indicates an in-progress remotely-triggered transition between 'dEq' and 'dEo' states. The 'nE1' state indicates an in-progress remotely-triggered transition between 'nEq' and 'nEo' states.

The 'dN0' state indicates an in-progress remotely-triggered transition between 'dEo' and 'I' states. The 'dN0p' state indicates an in-progress remotely-triggered transition between 'dEp' and 'nNp' states, or between 'dMh' and 'nNp' states. The 'dN0q' state indicates an in-progress remotely-triggered transition between 'dEq' and 'nNq' states, or between 'dMq' and 'nNq' states. The 'dN0t' state indicates an in-progress remotely-triggered transition between 'dEo' and 'I' states.

Referring now to FIG. 6, the set of possible stable coherence-list organization is shown. When describing specific cells within FIG. 6, the notation of FIG. 6x refers to cell x within FIG. 6. For example, FIG. 6a refers to cell a within FIG. 6.

Referring to FIG. 6a, the logical structure of a single shared cache copy is illustrated. The memory copy 70 has a pointer that identifies the first cache line 71 and the first cache line 71 has a physical-memory address that indirectly identifies the memory-line location. The double-headed pointer represents this pointer condition, wherein both memory-line 70 and cache-line 71 identify each other, a structure referred to as a doubly-linked list. Since the memory-line state is mS, the shared copy is constrained to be shared (e.g., nonmodifiable).

Referring to FIG. 6b, the logical structure of two shared copies is illustrated. The memory line 70 and the first cached line 71 identify each other. In a similar fashion, the first cached line 71 and the second cached line 72 identify each other, as shown by a distinct double-headed pointer. Since the memory-line state is mS, the shared copies are both constrained to be shared (e.g., nonmodifiable).

Referring to FIG. 6c, the logical structure of three shared copies is illustrated. The memory line 70 and the first cached line 71 identify each other; the first cached line 71 and the second cached line 72 identify each other; the second cached line 72 and the third cached line 73 identify each other, as shown by the double-headed pointers. Larger sharing-list lengths are possible; all but the first and last sharing-list caches have the Sb state of second cached line 72.

Referring to FIG. 6d, another possible structure with one shared line is shown. The memory line 70 and the first cached line 71 identify each other. Although the memory-line is in a modifiable-state 'mM', the first cached line 71 is unaware of this condition and therefore marked So (shared, read-only).

Referring to FIG. 6e, another possible structure with two shared copies is shown. The memory line 70 and the first cached line 71 identify each other; the first cached line 71 and the second cached line 72 also identify each other. The first cached line 71 is unaware of this condition and therefore neither cache line's data can be modified until its state is changed.

Referring to FIG. 6f, another possible structure with three shared copies is shown. The memory line 70 and the first cached line 71 identify each other; the first cached line 71 and the second cached line 72 identify each other; the second cached line 72 and the third cached line 73 identify each other. The first cached line 71 is unaware of this condition and therefore each of cache lines' data cannot be modified until its state is changed.

Referring to FIG. 6g, a possible structure with one exclusive/modifiable line is shown. The memory line 70 and the first cached line 71 identify each other. Since the memory-line state is modifiable-state mM, the first cached line 71 can have an exclusive state Eo, as illustrated. The first cached line 71 state of Eo allows its data to be modified immediate, without informing other caches.

Referring to FIG. 6h, a possible structure with one modifiable and one shared line is shown. The memory line 70 and the first cached line 71 identify each other; the first cached line 71 and the second cached line 72 identify each other. Since the memory-line state is modifiable-state M, the first cached line 71 can also have a modifiable state Mh, as illustrated. Since only one cached line can ever be modifiable, the second cached line 72 is constrained to have shared state St.

The term "modifiable" refers to the nature of the sharing-list with respect to memory, in that sharing-list data can be modified without first communicating with memory. However, valid shared copies must be invalidated when or before the data is modified, depending on the CPU architecture write-ordering requirements.

Referring to FIG. 6i, a possible structure with one modifiable and two shared copies is shown. The memory line 70 and the first cached line 71 identify each other; the first cached line 71 and the second cached line 72 identify each other; the second cached line 72 and the third cached line 73 identify each other. Since the memory-line state is modifiable-state M, the first cached line 71 can also have a modifiable state Mh, as illustrated. Since only one cached line can ever be modifiable, the second cached line 72 and third cached line 73 are constrained to have shared states Sb and St.

For many applications, data is commonly read by one CPU and written by the other, a scenario called pairwise sharing. To efficiently support this pairwise-sharing scenario, special sharing-list states/structures are supplied.

Referring to FIG. 6j, a possible structure with one modifiable and one shared line is shown. The memory line 70 and the first cached line 71 identify each other; the first cached line 71 and the second cached line 72 identify each other. A distinct Sq state in the second cached line 72 provides additional knowledge that a modifiable copy can be provided by the cache line's neighbor 71.

Referring to FIG. 6k, another possible structure with one modifiable and one shared line is shown. The memory line 70 and the first cached line 71 identify each other; the first cached line 71 and the second cached line 72 identify each other. The distinct Sp and Mq cache-line states provide the additional knowledge necessary for each cache to efficiently access and/or invalidate data copies located in the other.

Referring to FIG. 6l, a possible structure with one exclusive and one null line is shown. The memory line 70 and the first cached line 71 identify each other; the first cached line 71 and the second cached line 72 identify each other. The distinct Ep and Nq cache-line states provide the additional knowledge necessary for the first cache line 71 to be modified and the second cache line 72 to fetch the current cache-line data located within its neighbor cache line 71.

Referring to FIG. 6m, another possible structure with one modifiable and one shared line is shown. The memory line 70 and the first cached line 71 identify each other; the first cached line 71 and the second cached line 72 identify each other. The distinct Ep and Nq cache-line states provide the additional knowledge necessary for the second cache line 72 to be modified and the first cache line 71 to access the current cache-line data within its neighbor cache line 72.

Figure 7:
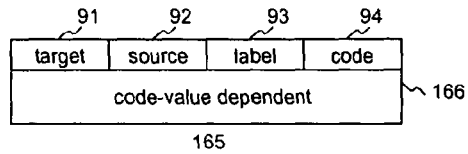
FIG. 7 illustrates the components with a packet that is sent over the system interconnect.

Referring to FIG. 7, the general format of packets sent over the system interconnect 69 is shown. A fundamental portion of the packet comprises a code field 94 that differentiates between request and response packets. For a request, the code field specifies what form of action is to be taken; for a response, the code field provides completion status (e.g., success or failure). The code field 94 (or a selected portion of it) is typically located at a common place within all packets, so that the code-dependent 166 portion of the packets of the packet can be decoded based on the code-supplied value.

The packet includes a target field 91 that identifies where the packet is sent and a source field 92 that identifies where the packet originated. The generator of a request packet, called the requester, places a distinct label field 93 value within request packets. The consumer of a request4er packet, called the responder, copies the label field 93 from the request within the response packet that it generates. The distinct label field 93 values allow the requester to associate the returned response packets with the appropriate context.

Referring now to FIG. 8, the set of code values for the memory controller 68 are shown. Memory controller codes have the format 'mAaBbbbN', where the meaning of these characters is listed below:

m—Identifies the code to be a request destined for the memory controller.

Aa—Identifies the variation of the command (e.g., shared or exclusive)
    Na: A noncoherent access is preferred, all of the line is accessed.
    Nb: A noncoherent access is preferred, selected mask-specified bytes are accessed.

Bbbb—Identifies the data-transfer properties:

Clear: Provides implied-to-be-zero data to the responder; only status is returned in the response.

Mark: Provides only the code (no data) to the responder; only status is returned in the response.

Read: Causes data to be returned in the response packet.

Swap: Provides data to the responder; data is also returned in the response.

Write: Provides data to the responder; no data is returned in the response.

N—Differentiates between part-0 and part-1 components, when a request is split into two.

If a value of 0 or 1 is not supplied, the request has not yet been split. The mNaRead code is intended to return all data from the addressed memory line; the mNaRead code is intended to return mask-value selected data bytes from the addressed memory line. The mNaWrite code is intended to write all data within the addressed memory line; the mNaRead code is intended to write mask-value selected data bytes within the addressed memory line. The mNaClear code is intended to clear (set to zero) all data within the addressed memory line; the mNaRead code is intended to clear mask-value selected data data within the addressed memory line.

The mNaSwap code is intended to swap all data within the addressed memory line; the mNbSwap code is intended to swap mask-value selected data bytes within the addressed memory line. Distinct code extension values are used to specify special swap-like operations, such as fetch-and-add, that return the old memory-line data before updating memory based on the request-provided data.

While the stated preference is to perform the mNaRead, mNaRead, mNaWrite, and mNaRead code specified operations on memory, this may not be possible if the memory line is cached in another CPU or the desired data transfer is not supported by the memory controller. In these cases, the requester's cache line forms or joins an existing) sharing list and an intended-to-be-cached data line is returned.

The mEcRead code is intended to return a cacheable copy, with a preferred cache-line state of cE (any of cEo, cEp, or cEq). The mEcMark code is intended to return an owned cache-line state, with a preferred cache-line state of nE (any of nEo, nEp, or nEq). In both cases, a dirty dEo copy is never returned.

The mEdRead code is intended to return a cacheable E (any of cEo, cEp, cEq, dEo, dEp, or dEq) copy. The mEdMark code is intended to return an owned cache-line state, with a preferred cache-line state changing to dE (any of dEo, dEp, or dEq). the intent is to avoid forcing the dirty data back to memory.

The mMcRead code is intended to return a cacheable copy, with a preferred cache-line state of cM (either cMh or cMq). The mMdRead code is intended to return a cacheable copy, with a preferred cache-line state of M (any of cMh, cMq, dMh, or dMq); the intent is to avoid forcing the dirty data back to memory.

The mSeRead code is intended to return a cSo or cEo, if a sharing-list is present or absent respectively. The intent is to provide the first caching CPU (that is likely to store after a load) with cache-line state that can be modified. The mSs-Read code is intended to return a cSo copy (for possible use by instructions, whose addresses are rarely).

The mScRead code is intended to return a cSo or cM (cMh or cMq) state to avoid the overhead of a washing step (converting memory state from mM to mS) on infrequent read-only or mixed read/write accesses. The mSdRead code is intended to return a cSo or M state (cMh, cMq, dMh, or dMq) to avoid the overhead of forcing dirty data back to memory.

The mEcRead, mEcMark, mEdRead, mMcRead, mMdRead, mSeRead, mScRead, mSdRead, mSsRead codes are intended to return a cacheable copy. If sent to a noncoherent memory controller (one that does not have memory tags), an error status is returned. Otherwise, the requester's cache line forms or joins an existing) sharing list and an intended-to-be-cached data line is returned.

The mCuMark code is intended to update the sharing-list state (but not its sharing-list pointer) to facilitate the change of a sharing-list head from S to E or M states, with the respective change in memory state from mS to mM, so that a sharing-list head can modify its currently-cached data. The mCuRead code is intended to similarly update the sharing-list and memory states, so that a sharing-list head can fetch and modify its addressed data. In both cases, the memory-state update is nullified if the sharing-list pointer has prematurely changed to identify the next sharing-list head.

The mChMark code is intended to update the sharing-list state in memory, to the 'ml' state, when necessary to account for a self-triggered deletion of the only/clean sharing-list entry. The mChWrite code is intended to update the sharing-list state in memory, to the 'ml' state, when necessary to account for a self-triggered deletion of the only/dirty sharing-list entry.

The mCnMark code is intended to update the sharing-list pointer in memory, when necessary to account for a self-triggered deletion of the sharing-list head. The mChMark code is intended to update the sharing-list state in memory, to the 'ml' state, when necessary to account for a self-triggered deletion of the only/clean sharing-list entry. The mChWrite code is intended to update the sharing-list state in memory, to the 'ml' state, when necessary to account for a self-triggered deletion of the only/dirty sharing-list entry.

The mTnRead0 code facilitates the reading of memory-line data, when a new cache-line joins old sharing-list and no data is present in the old sharing-list head. The part-0 portion identifier for this request allows the a distinct status code (corresponding to the part-1 portion of the request) to be returned while the read is performed. The mTsRead0 code is like the mTnRead0 code, but its distinct encoding forces the return of a shared-only indication on the returned response.

The mTnWrite1 code facilitates the writing of memory-line data, when a new cache-line joins old sharing-list and dirty data is present in the old sharing-list head. The part-1 portion identifier for this request allows the a distinct status code (corresponding to the part-0 portion of the request) to be returned while the read is performed.

The mTwRead0 code facilitates the washing of memory-line state, when a new cache-line joins old sharing-list, no data is present in the old sharing-list head, and the memory line must be washed. The mTwMark1 code facilitates the washing of memory-line state, when a new cache-line joins old sharing-list, clean data is present in the old sharing-list head, but the memory line must be washed. The mTwWrite1 code facilitates the washing of memory-line state, when a new cache-line joins old sharing-list, dirty data is present in the old sharing-list head, and the memory line must be washed.

Referring now to FIG. 9, the set of request-code values generated by the memory controller 68 are shown. Memory controller codes have the format 'daBbCcccN', where the meaning of these characters is listed below:

d—Identifies the code to be a directive request consumed by a sharing-list cache.

a—Identifies the type of directive request:
  s: Sourced by a memory; triggered by a memory-line request; state was mS.
  n: Sourced by a memory; triggered by a memory-line request; state was not mS.
  e: Sourced by an existing sharing-list cache.
Bb—Identifies the variation of the command.
Cccc—Identifies the data-transfer properties:
Mark: Provides only status; no data is be returned in the response packet.
Read: Causes data to be returned in the response packet.
N—Differentiates between part-0 and part-1 components, when a request is split into two.

If a value of 0 or 1 is not supplied, both components remain present. The dsSsRead code requests a shared cache-line copy. The dsMcRead code requests a modifiable forced-to-be-clean cache-line copy. The dsEcRead code requests an exclusive forced-to-be-clean cache-line copy. The dsSsMark1 code requests an extended sharing-list, but assumes the data has been transferred from memory. The dsSsMark1 code requests a truncated sharing-list, but also assumes the data has been transferred from memory.

The distinction between the dsSsRead, dsMcRead, and dsEcRead codes from their like named dnSsRead, dnMcRead, and dnEcRead requests relates to their error-detection capabilities. If any of the dsSsRead, dsMcRead, and dsEcRead codes attempt to access a sharing-list head that is not in a shared state (So or Sh), a protocol inconsistency error is present, since memory believed the sharing-list was shared.

The dnSsRead code requests a shared-only cache-line copy, for the purpose of sustaining a sharing sharing-list state while a washing operation progresses. The dnSwRead code requests a shared-only cache-line copy, while concurrently forcing the washing operation to complete.

The dnMcRead code requests a modifiable forced-to-be-clean cache-line copy; the dnMdRead code requests a modifiable allowed-to-be-dirty cache-line copy. The dnEcRead code requests an exclusive forced-to-be-clean cache-line copy; the dnMdRead code requests an exclusive allowed-to-be-dirty cache-line copy.

The dnEcMark code requests a modifiable forced-to-be-clean dataless cache-line state; the dnEdMark code requests a modifiable allowed-to-be-dirty cache-line state. The requester that initially triggers the dnEdMark state has the responsibility of updating the entire cache line, since memory may be inconsistent with previously updated cache-line state.

The dePcMark0 and dePcMark1 codes request an extension to the old sharing-list head, allowing existing copies to remain listed. Distinct component parts provide the design freedom to split their previously unified request into either memory-write and dePcMark0 parts or memory-read and dePcMark1 parts.

The deTcMark0 and deTcMark1 codes request a collapse of the old sharing-list head, causing existing copies to be discarded. Distinct component parts provide the design freedom to split their previously unified request into either memory-write and deTcMark0 parts or memory-read and deTcMark1 parts.

Referring now to FIG. 10, the set of request-code values generated by the CPUs 58a and 58b are shown. These cache-to-cache codes have the format 'caBbCcccN', where the meaning of these characters is listed below:
 c—Identifies the code to be a generated and consumed by sharing-list caches.
 a—Identifies the type of directive request:
 c: Sourced by a cache, without awareness of pairwise sharing.
 p: Sourced by a cache, without knowledge of pairwise sharing.
 Bb—Identifies the variation of the command.
 Cccc—Identifies the data-transfer properties:
 Mark: Provides only status; no data is be returned in the response packet.
 Read: Causes data to be returned in the response packet.
 N—Differentiates between part-0 and part-1 components, when a request is split into two.
If a value of 0 or 1 is not supplied, both parts are unified and remain present.

The ccTnRead code is generated by the sharing-list tail, with the intent of receiving data from the head-side sharing-list cache. The ccTnMark code is generated by the sharing-list tail, with the intent of deleting itself from the existing sharing-list. If the head-side sharing-list entry has no valid data, the effects of the ccTnRead and ccTnMark codes are equivalent.

The ccB1Mark code is generated by a sharing-list body, to be executed after the completion of a preceding ccB0Mark code, for the purpose of updating the head-side sharing-list pointer. The intent is to complete a previously initiated sharing-list deletion.

The ccB0Read code is generated by the sharing-list body, with the intent of receiving data from the tail-side sharing-list cache. The ccB0Mark code is generated by the sharing-list body, with the intent of initiating the deletion of itself from an existing sharing-list. If the tail-side sharing-list entry has no valid data, the effects of the ccTnRead and ccTnMark codes are equivalent.

The ccH0Mark code is generated by the sharing-list head and sent to its tail-side entry, with the intent of initiating its deletion from an existing sharing list. After updating the memory-line pointer to the sharing-list head, a following ccH1Mark is responsible for completing the sharing-list head deletion.

The ccTdMark0 and ccTdMark1 codes reactivate a residual dirty entry that was inactivated for the purpose of supporting fault-tolerant data transfers. Distinct component parts provide the design freedom to efficiently complete unified requests that were split into either memory-write and deTcMark0 parts or memory-read and deTcMark1 parts.

The ccPokeWake code is sent from one cache to another, for the purpose of activating an idled cache-line state. The intent is to reactivate sharing-list updates, after the conflict that prevented the update is resolved.

The cpSaRead code is generated by a cache in the nNp or nNq state, to fetch a cached copy from its sharing-list neighbor. The cpSaRead code is generated by a cache in the nNp or nNq state, to fetch an uncached copy from its sharing-list neighbor, without changing the neighbor's cache-line state.

The cpMcRead code is generated by a cache in the nNp state, to fetch a cached copy and change its state to cMh. The cpEcRead code is generated by a cache in the nNp state, to fetch a cached copy and change its state to cEp. The cpEcMark code is generated by a cache in the nNp state, to fetch cache-ownership rights and change its state to nEp. In all cases, a previously-dirty cache line is forced to update memory, so that a clean copy is always provided.

The cpMdRead code is generated by a cache in the nNp state, to fetch a cached copy and change its state to cMh or dM; the cpMdRead code is also generated by a cache in the nNq state, to fetch a cached copy and change its state to cMq or dMq. The cpEdRead code is generated by a cache in the nNp state, to fetch a cached copy and change its state to cEp or dEp; the cpEdRead code is also generated by a cache in the nNq state, to fetch a cached copy and change its state to cEq or dEq. The cpEdMark code is generated by a cache in the nNp state, to fetch cache-ownership rights and change its state to nEp or (after an immediate full-line write) dEp; the cpEdMark code is also generated by a cache in the nNq state, to fetch cache-ownership rights and change its state to nEq or (after an immediate full-line write) dEq. In all of these cases, a previously-dirty cache line is not forced to update memory.

The cpTnMark code is generated by a first cache in the Mp or Mq states, to invalidate a second cached copy and change the first cache-line state to Ep or Eq, respectively.

Referring now to FIG. 11, the set of data-present response-code values generated by a responder are shown. These status codes have the format 'sDataBbCcccN', where the meaning of these characters is listed below:
 sData—Identifies the code to be a data-present status returned by the responder.
 Bb—Specifies the variation of the status type.
 Cccc—Specifies the status type
 N—Differentiates between component parts:
 -: part-0 or part-1 components are present.
 0: A split part-0 component.
 1: A split part-1 component.
 2: Unified (both part-0 and part-1) components.

The sDataLast code indicates the absence of additional sharing-list entries; the requester's cache-line state is allowed to be modified. The sDataMore code indicates the presence of at least one additional sharing-list entry; the requester's cache-line state is allowed to be modified. The sDataSMore code indicates the presence of at least one additional sharing-list entry; the requester's cache-line state is forced to shared. The sDataEcPair code indicates a pairwise sharing list, with exactly one additional sharing-list entry. The sDataMcPair code indicates a pairwise sharing list, exactly one additional sharing-list entry.

The sDataLast0 code indicates the absence of additional sharing-list entries; the requester's cache-line state is allowed to be modified. The sDataMLast0 code indicates the absence of additional sharing-list entries; the requester's cache-line state is forced to dirty, to accommodate returned modified data. The sDataSLast0 code indicates the absence of additional sharing-list entries; the requester's cache-line state is forced to shared, to maintain consistency with the memory-line state.

The sDataMore0 code indicates the presence of at least one additional sharing-list entry; the requester's cache-line state is allowed to be modified. The sDataMMore0 code indicates the presence of at least one additional sharing-list entry; the requester's cache-line state is forced to dirty, to accommodate returned modified data. The sDataSMore0 code indicates the presence of at least one additional sharing-list entry; the requester's cache-line state is forced to shared, to maintain consistency with the memory-line state.

The sDataEcPair0 code indicates a pairwise sharing list; head and tail sharing-list requesters change state to pEc and qEc respectively. The sDataEdPair0 code indicates a pairwise sharing list; head and tail sharing-list requesters change state to pEd and qEd respectively. The sDataMcPair0 code indicates a pairwise sharing list; head and tail sharing-list requesters change state to pMc and qMc respectively. The sDataMdPair0 code indicates a pairwise sharing list; head and tail sharing-list requesters change state to pMd and qMd respectively.

The sDataLast0, sDataMLast0, sDataSLast0, sDataMore0, sDataMMore0, sDataSMore0, sDataEcPair0, sDataEdPair0, sDataMcPair0, and sDataMdPair0 codes provide only the part-0 status component; another packet is used to return the part-1 status.

The sDataDone2 code indicates the completion of the specified requester action. The sDataHome2 code indicates the requester's cache line is invalid (no longer within the sharing-list) and may be used for other purposes.

The sDataLast2 code indicates the absence of additional sharing-list entries; the requester's cache-line state is allowed to be modified. The sDataMLast2 code indicates the absence of additional sharing-list entries; the requester's cache-line state is forced to dirty, to accommodate returned modified data. The sDataSLast2 code indicates the absence of additional sharing-list entries; the requester's cache-line state is forced to shared, to maintain consistency with the memory-line state.

The sDataMore2 code indicates the presence of at least one additional sharing-list entry; the requester's cache-line state is allowed to be modified. The sDataMMore2 code indicates the presence of at least one additional sharing-list entry; the requester's cache-line state is forced to dirty, to accommodate returned modified data. The sDataSMore2 code indicates the presence of at least one additional sharing-list entry; the requester's cache-line state is forced to shared, to maintain consistency with the memory-line state.

The sDataBLast2 code allows the requester's cache-line state to change from 1 to St. The sDataBMore2 code allows the requester's cache-line state to change from 1 to Sc. These status codes optimize the forming of shared-state sharing lists, by halving the number of required packet transmissions.

The sDataEcPair2 code indicates a pairwise sharing list; head and tail sharing-list requesters change state to pEc and qEc respectively. The sDataEdPair2 code indicates a pairwise sharing list; head and tail sharing-list requesters change state to pEd and qEd respectively. The sDataMcPair2 code indicates a pairwise sharing list; head and tail sharing-list requesters change state to pMc and qMc respectively. The sDataMdPair2 code indicates a pairwise sharing list; head and tail sharing-list requesters change state to pMd and qMd respectively.

The sDataDone2, sDataHome2, sDataLast2, sDataMLast2, sDataSLast2, sDataMore2, sDataMMore2, sDataSMore2, sDataBLast2, sDataBMore2, sDataEcPair2, sDataEdPair2, sDataMcPair2, and sDataMdPair2 codes provide both part-0 or part-1 status components, within a single unified packet.

Referring now to FIG. 11, the set of data-absent response-code values generated by a responder are shown. These status codes have the format 'sVoidBbCcccN', where the meaning of these characters is listed below:

sVoid—Identifies the code to be a data-absent status returned by the responder.
Bb—Specifies the variation of the status type.
Cccc—Specifies the status type
N—Differentiates between component parts:
-: part-0 or part-1 components are present.
0: A split part-0 component.
1: A split part-1 component.
2: Unified (both part-0 and part-1) components.

The sVoidFault0, sVoidFault1, and sVoidFault2 codes indicate a fatal inconsistency between dependent sharing-list states; these return split part-0, split part-1, and unified part-0/part-1 components respectively. The sVoidBad2 code indicates coherent request failed when delivered to a noncoherent memory controller; unified part-0/part-1 components are provided.

The sVoidDone code indicates the absence of intermediate status information, with no conflict implied. The sVoidLast code indicates the absence of additional sharing-list entries. The sVoidMore code indicates the presence of at least one additional sharing-list entry.

The sVoidEcPair code indicates the absence of impending status, allowing early changes to the pEc or qEc states, for head and tail sharing-list entries respectively. The sVoidMcPair code indicates the absence of impending status, allowing early changes to the pMc or qMc states, for head and tail sharing-list entries respectively.

The sVoidDone, sVoidMore, sVoidEcPair, and sVoidMcPair codes provide early status information, before either part-0 or part-1 status components are available.

The sVoidCode0 and sVoidCode1 codes are internal status codes that are set to fake the completion of part-0 or part-1 components, when only one of these components is included within the initiating request packet.

The sVoidLast0 code indicates the absence of additional sharing-list entries. The sVoidMore0 code indicates the presence of at least one additional sharing-list entry. These sVoidLast0 and sVoidMore0codes provide only the part-0 status component; another packet is used to return the part-1 status.

The sVoidEcPair0 code indicates a pairwise sharing list; head and tail sharing-list requesters change state to pEc and qEc respectively. The sVoidEdPair0 code indicates a pairwise sharing list; head and tail sharing-list requesters update all data bytes and then change state to pEd and qEd respectively.

The sVoidLast0, sVoidMore0, sVoidEcPair0, and sVoidEdPair0 codes provide only the part-0 status component; another packet is used to return the part-1 status.

The sVoidDone1 code indicates the absence of intermediate status information, with no conflict implied. The sVoidLast1 code indicates the absence of additional sharing-list entries. The sVoidMore1 code indicates the presence of at least one additional sharing-list entry.

The sVoidDone1, sVoidLast1, and sVoidMore1 codes provide only the part-1 status component; another packet is used to return the part-0 status.

The sVoidDone2 code indicates the absence of intermediate status information, with no conflict implied. The sVoidHome2 code indicates the requester's cache line is invalid (no longer within the sharing-list) and may be used for other purposes.

The sVoidLast2 code indicates the absence of additional sharing-list entries; the requester's cache-line state is allowed to be modified. The sVoidMLast2 code indicates the absence of additional sharing-list entries; the requester's cache-line state is forced (after all data bytes are modified) to dirty. This sVoidMLast2 is used to avoid unnecessary data transfers when all data bytes within the line are being modified.

The sVoidNope2 code indicates the absence of intermediate status information, with a first-of-two-phases conflict implied; the requester is deactivated until a wakeup indication is returned. The sVoidNone2 code indicates the absence of intermediate status information, with a final-phase conflict implied; the requester is deactivated until a wakeup indication is returned.

The sVoidEcPair2 code indicates a pairwise sharing list; head and tail sharing-list requesters change state to pEc and qEc respectively. The sVoidEdPair2 code indicates a pairwise sharing list; head and tail sharing-list requesters update all data bytes and then change state to pEd and qEd respectively.

The sVoidDone2, sVoidHome2, sVoidLast2, sVoidMLast2, sVoidMLast2, sVoidNope2, sVoidNone2, sVoidEcPair2, and sVoidEdPair2 cods provide both part-0 or part-1 status components, within a single unified packet.

The sPokeWake code provides a wakeup indication, to reactivate cache-line processing when a conflicting action completes. The packet that transports the sPokeWake code if formatted as a request, but transported as a response packet to avoid possible request-forwarding deadlocks.

Referring now to FIG. 13, the algorithm for combining values from tracker response storage location resp0 146 and resp1 147 is shown in tabular form, assuming that only the part-1 response codes are placed in the resp1 location; all other responses are placed in the resp0 location. A preprocessing step implements this combining algorithm, thus eliminating the need for the components to manage a wide range of status-code combinations.

Figure 14:
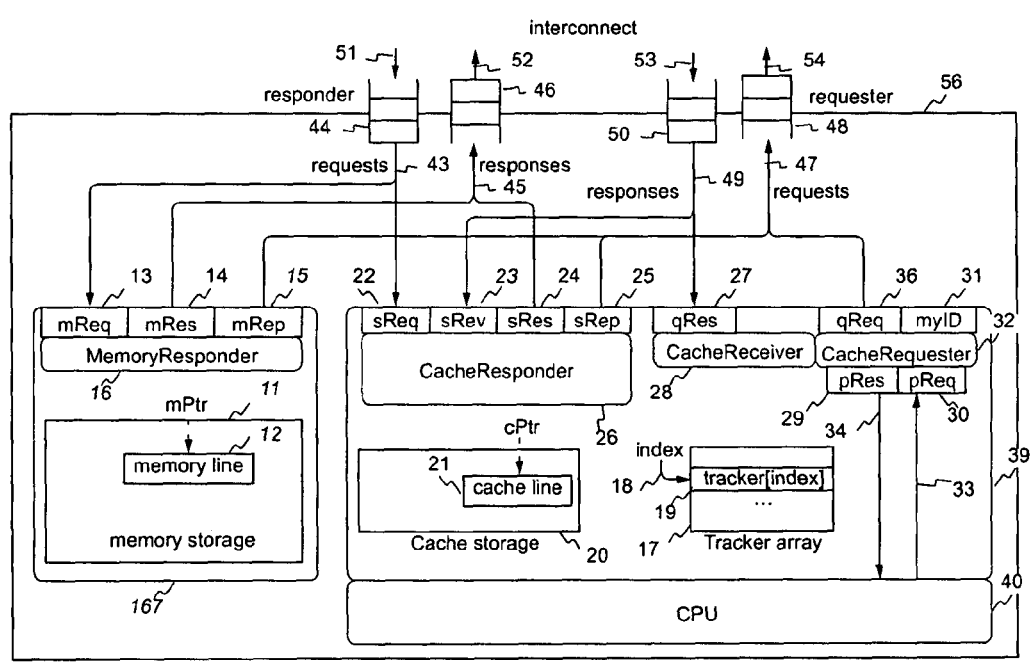
FIG. 14 illustrates the components that are present within a coherent unit of a multiprocessor system.

Referring now to FIG. 14, the components within a coherent entity comprising both cache and memory components are shown within a single cache-coherent unit 56. One trained in the art would understand these components could also be separated.

The cache-coherent unit 56 has requester queues. The requester's outbound requests are delivered over wires 47, pass through the requester's outbound request queue 48 and are routed to the system interconnect via wires 54. The requester's inbound responses are routed from system interconnect wires 53 into inbound response queue 50, then placed on internal wires 49.

The coherent unit 56 has responder queues. The responder's inbound requests are routed from system interconnect wires 51 into inbound request queue 44, then placed on internal wires 43. The responder's outbound responses are delivered over wires 45, pass through the requester's outbound response queue 46 and are routed to the system interconnect via wires 42.

The memory controller 167 has queues for holding inbound and outbound packets. Incoming requests are placed into the mReq (memory request) queue 13, before servicing by the MemoryResponder 16. Processing of these requests can generated responses that are placed into the mRes (memory response) queue 14, and possibly an additional request placed into the mRep (memory request plus) queue 15. If the mRep queue 15 is full when a request is processed by MemoryResponder 16, the secondary request code is instead placed within the status packet that is placed in mRes queue 14.

When processing its queued requests, MemoryResponder 16 may access memory line 12 located within memory storage 11. The processing of each request is assumed to access one and only one memory line.

The CPU unit 40 has connections to the pReq queue 30 over wires 33, wherein requests are delivered by the CPU. The CPU unit 40 also has connections to the pRes queue 29 over wires 34, wherein responses are delivered to the CPU. The CacheRequester 32 is responsible for processing request packets from the pReq 30 queue, accessing cache (over paths not illustrated) and (if necessary) placing a request into qReq queue 36, for the purpose of interrogating other caches. These requests oftentimes generate returned responses, which arrive through the qRes queue 27, are processed by the CacheReceiver 28, and made available to the CacheRequester 32.

Before sending requests, CacheRequester 32 allocates additional context information by allocating a tracker entry 19 within a tracker array 17, for the purpose of providing context for processing the returned response. The index 18 of the tracker entry 19 is placed within request packets placed within the qReq queue and is provided within responses arriving via the qRes queue 27. The index is used as the label 93 within a request packet; a unique local identifier myID 31 is the value inserted into the source field 92 of the request packet.

CacheResponder 32 is responsible for processing request packets previously placed into the sReq queue 22. Processing of these requests can generated responses that are placed into the sRes (CacheResponder response) queue 24, and possibly an additional request placed into the sRep (CacheResponder request plus) queue 25. If the sRep queue 25 is full when a request is processed by CacheResponder 32, the secondary request code is instead placed within the status packet that is placed in sRes queue 24.

The CacheRequester 32 and CacheResponder 32 can independently access nonoverlapping cache-line locations. However, when accessing an overlapping cache-line location, the operations of one are allowed to complete, in an indivisible fashion, before the operations of the other are started. Since the cache-line operations are quickly completed, this constraint has a minimal impact on the overall system performance.

CacheResponder 32 is also responsible for processing a special qResAddrLine response packet 88, which flows through the interconnect like a response but has the format of a request. Processing of such a response packet updates the tracker-entry state, without generating an additional request or response packet.

Figure 15:
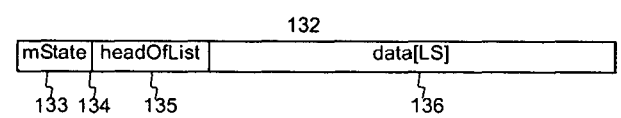
FIG. 15 illustrates the tag fields that are present a coherent memory line.

Referring now to FIG. 15, the contents of a memory line 12 are shown. The mState field 133 provides state information, retaining one of the values specified in FIG. 3. The headOfList field 135 identifies the sharing-list head with a format of a target address 91 within packets 165 sent over the interconnect. The data field 136 provides storage for the number of bytes within a line. The combination of the mState field 133 and headOfList field 135 is commonly referred to as the memory tag 134.

Figure 16:
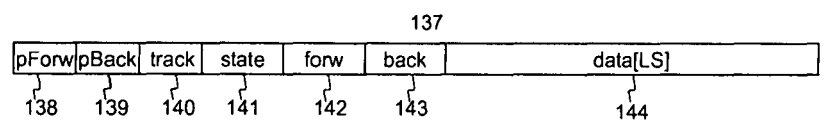
FIG. 16 illustrates the tag fields that are present a coherent cache line.
Figure 17:
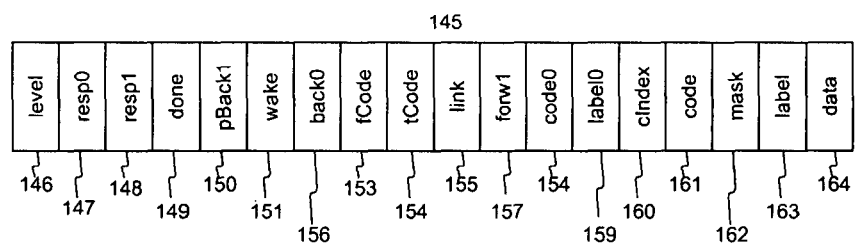
FIG. 17 illustrates the fields that are present within a tracker entry.

Referring now to FIG. 16, the contents of a cache line 21 are shown. Nonzero values of the pForw bit 138 and pBack bit 139 indicated a wakeup of the head-side and tail-side sharing-list entries is required, once the cache line state has stabilized. The track bit 140 comprises two values that identify whether or not a tracker entry is associated with this cache line entry. The state field 141 comprises sufficient storage to distinctively identify each of the possible cache-state values, as listed in FIG. 4 and FIG. 5.

When applicable, the forw field 142 identifies the head-side neighbor in the sharing list; the back field 143 identifies the tail-side neighbor in the sharing list, with a format of a target address 91 within packets 165 sent over the interconnect. In both cases, these fields have the format of a target address 91 within packets 165 sent over the interconnect. The data field 136 provides storage for the number of bytes within a line.

The back field 143 assumes a special meaning when the track bit 140 indicates a tracker entry is affiliated with the cache line. In this case, the back field 143 comprises a pointer to the affiliated tracker; the back field functionality is effectively transferred a tracker-supplied field.

Referring now to FIG. 15, the contents of a tracker entry 19 are shown. The level field 146 comprises storage to identify levels of access-allowed priority. For example, a cache line assumes a highest priority when fetching data from memory, a higher priority when performing pairwise-sharing updates, a lower priority when deleting itself from the list, and a lowest priority when its state is stable.

The resp0 field 147 and resp1 field 148 provide storage for the part-1 and part-2 responses that can be returned during state-update sequences. These fields each comprise sufficient storage to distinctively identify each of the possible status-code values, as listed in FIG. 11 and FIG. 12.

The done bit 149 inhibits extractions of the current cache-line state, to ensure at least one access occurs before the cache line state is changed by others. This bit is set upon the completion of the first cache-update operation.

The pBack1 bit 150 is set when an conflicting access from a head-side neighbor, when the entry is momentarily in two sharing-list places, and the conflicting access is refused. The intent is to reactivate that neighbor when the conflict has been resolved.

The wake bit 151 is set to activate continued processing of this (possibly deactivated) cache line. This line is set by a neighbor, when a conflicting access has been resolved.

The back0 field 152 comprises a saved version of the pBack field 139 from within the associated cache line 137, allowing this cache-line field to used for other purposes when a tracker is present.

The fCode field 153, tCode field 154, and link field 155 values are copies of the secondary-code values returned within response packet 89 or 90. These are available for initiating additional packet transmissions, on behalf of the previously congested responder.

The code0 field 158 and label0 field 159 values comprise copies of the code 94 and label 93 values from a previously consumed (but not yet processed) ownership-transfer request packet.

The forw1 field 157 identifies the secondary sharing-list tail-side neighbor, when the entry concurrently resides at two sharing-list locations.

The cIndex field 160 comprises a index for addressing the associated cache line 137.

The code field 161, mask field 162, data field 164, and label field 163 are copies of processor-request parameters, extracted from a pReq queued request. Enqueuing these parameters within the tracker frees the pReq queue 30 entry for other uses while the cache-line state is change to accommodate the queued processor-provided request.

Figure 18:
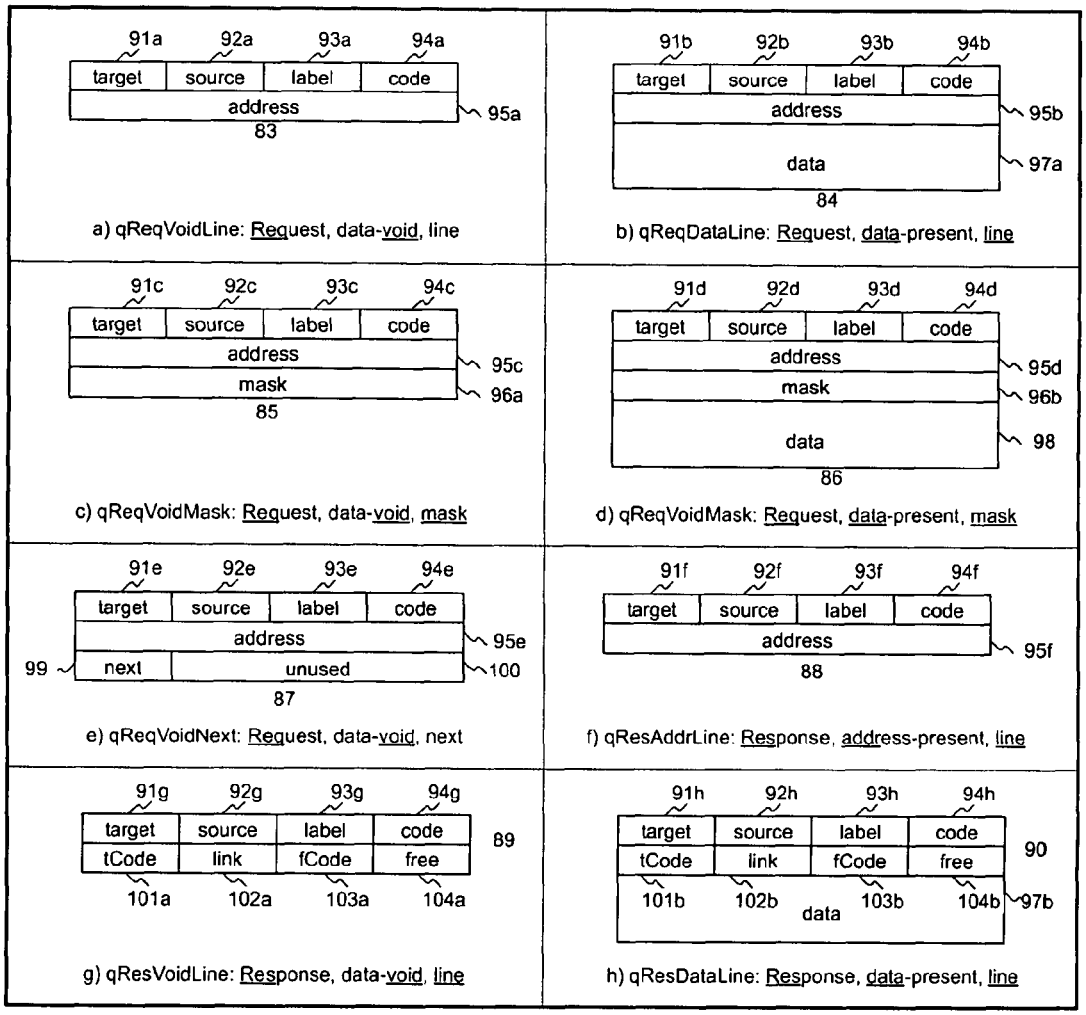
FIG. 18 illustrates the formats of the distinct packet types that are sent over the system interconnect.

Referring now to FIG. 18a, the components within qReqVoidLine request packet 83 are shown. The target field 91a provides the identity of the addressable unit to which the packet is destined and is used by address recognition hardware within routers and the destination. The source field 92a provides the identity of the addressable unit from which the packet is sourced and is used to provide response packets with the target addresses. The label field 93a is provided by a requester and returned unchanged by the responder, for the purposes of distinguishing between multiple possible returning responses. The code field 94a specifies the action to be performed at the destination. The address field 95a specifies the location within the destination that is accessed.

Referring now to FIG. 18b, the components within qReqDataLine request packet 84 are shown. The target field 91b provides the identity of the addressable unit to which the packet is destined and is used by address recognition hardware within routers and the destination. The source field 92b provides the identity of the addressable unit from which the packet is sourced and is used to provide response packets with the target addresses. The label field 93b is provided by a requester and returned unchanged by the responder, for the purposes of distinguishing between multiple possible returning responses. The code field 94b specifies the action to be performed at the destination. The address field 95b specifies the location within the destination that is accessed. The data field 97a provides data bytes, where the number of data bytes equals the line size.

Referring now to FIG. 18c, the components within qReqVoidMask request packet 85 are shown. The target field 91c provides the identity of the addressable unit to which the packet is destined and is used by address recognition hardware within routers and the destination. The source field 92c provides the identity of the addressable unit from which the packet is sourced and is used to provide response packets with the target addresses. The label field 93c is provided by a requester and returned unchanged by the responder, for the purposes of distinguishing between multiple possible returning responses. The code field 94c specifies the action to be performed at the destination. The address field 95c specifies the location within the destination that is accessed. The mask field 96a specifies which of the byte locations within the address-specified line address are accessed.

Referring now to FIG. 18d, the components within qReqDataMask request packet 86 are shown. The target field 91d provides the identity of the addressable unit to which the packet is destined and is used by address recognition hardware within routers and the destination. The source field 92d provides the identity of the addressable unit from which the packet is sourced and is used to provide response packets with the target addresses. The label field 93d is provided by a requester and returned unchanged by the responder, for the purposes of distinguishing between multiple possible returning responses. The code field 94d specifies the action to be performed at the destination. The address field 95d specifies the location within the destination that is accessed. The mask field 96b specifies which of the byte locations within the address-specified line address are accessed. The data field 97b provides data bytes, where the number of data bytes equals the line size.

Referring now to FIG. 18e, the components within qReqVoidNext request packet 87 are shown. The target field 91e provides the identity of the addressable unit to which the packet is destined and is used by address recognition hardware within routers and the destination. The source field 92e provides the identity of the addressable unit from which the packet is sourced and is used to provide response packets with the target addresses. The label field 93e is provided by a requester and returned unchanged by the responder, for the purposes of distinguishing between multiple possible returning responses. The code field 94e specifies the action to be performed at the destination. The address field 95e specifies the location within the destination that is accessed. The next field 99 provides the location of a cache, based on the format of the target field 91e. The unused field 100 pads the packet to the next conveniently aligned boundary.

Referring now to FIG. 18f, the components within qResAddrLine response packet 88 are shown. The target field 91f provides the identity of the addressable unit to which the packet is destined and is used by address recognition hardware within routers and the destination. The source field 92f provides the identity of the addressable unit from which the packet is sourced and is used to provide response packets with the target addresses. The label field 93f is provided by a requester and returned unchanged by the responder, for the purposes of distinguishing between multiple possible returning responses. The code field 94f specifies the action to be performed at the destination. The address field 95f specifies the location within the destination that is accessed.

Referring now to FIG. 18g, the components within qResVoidLine response packet 89 are shown. The target field 91g provides the identity of the addressable unit to which the packet is destined and is used by address recognition hardware within routers and the destination. The source field 92g provides the identity of the addressable unit from which the packet is sourced and is used to provide response packets with the target addresses. The label field 93g is provided by a requester and returned unchanged by the responder, for the purposes of distinguishing between multiple possible returning responses. The code field 94g specifies the action to be performed at the destination. The fCode field 103a (if not null) specifies a request code for a request packet to be generated when the response returns to the requester, with an implied target address. The tCode field 101a (if not null) specifies a request code for a request packet to be generated when the response returns to the requester, with an explicit target address specified by the link field 102a. The free field 100 pads the packet to the next conveniently aligned boundary.

Referring now to FIG. 18h, the components within qResDataLine response packet 90 are shown. The target field 91h provides the identity of the addressable unit to which the packet is destined and is used by address recognition hardware within routers and the destination. The source field 92h provides the identity of the addressable unit from which the packet is sourced and is used to provide response packets with the target addresses. The label field 93h is provided by a requester and returned unchanged by the responder, for the purposes of distinguishing between multiple possible returning responses. The code field 94h specifies the action to be performed at the destination. The fCode field 103b (if not null) specifies a request code for a request packet to be generated when the response returns to the requester, with an implied target address. The tCode field 101b (if not null) specifies a request code for a request packet to be generated when the response returns to the requester, with an explicit target address specified by the link field 102b. The free field 104b pads the packet to the next conveniently aligned boundary. The data field 97 provides data bytes, where the number of data bytes equals the line size.

The basic concepts of sharing-list updates is examined in the IEEE Std 1596-1995 and will not be detailed herein. However, the specific variations form the basic of the invention and therefore are described herein.

Figure 19:
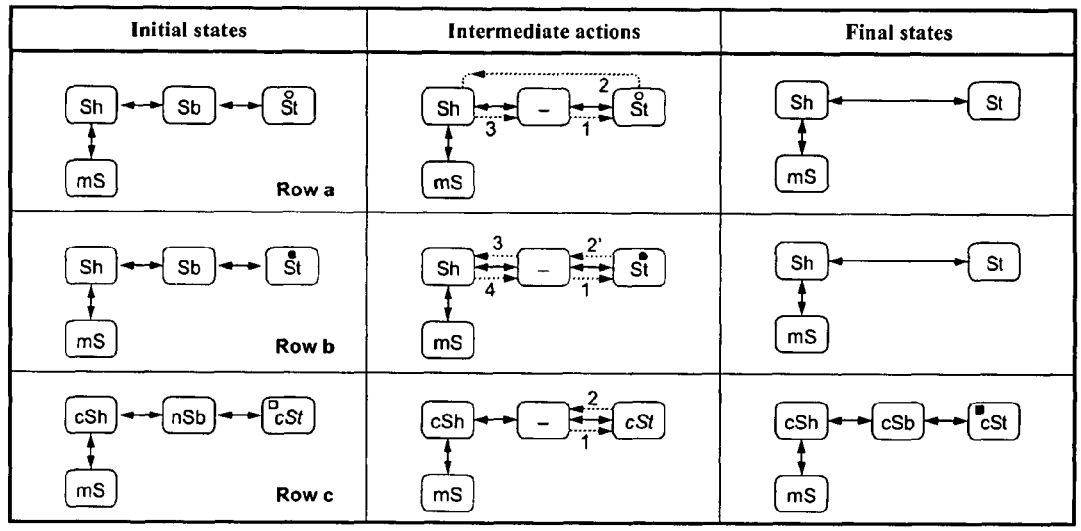
FIG. 19 illustrates the sequence of packets used to delete a body entry from an existing sharing list.
Figure 20:
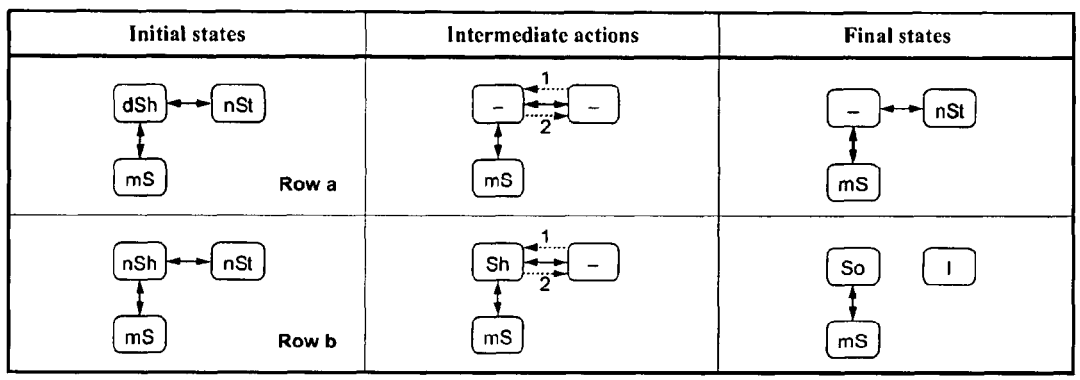
FIG. 20 illustrates the sequence of packets used to delete a tail entry from an existing sharing list.

Referring now to FIG. 19, possible sequences for deletion of a sharing-list body entry are shown. Within this and similar figures, each row represents a distinct sharing-list update sequence and is identified by a figure number suffix, e.g. FIG. 19b specifies the sequence in the second row of FIG. 19.

Within any row, the left-side cell illustrates the initial sharing-list state for a particular cache line, wherein the sharing-list states are labeled in each entry and pointers are illustrated as solid lines. The center cell illustrates the flow of packets, using dotted lines to distinguish packet flows from established links. The right-side cell shows the resulting sharing-list structure result after the packets have been processed.

Referring now to FIG. 19a, the most efficient sequence for deletion of a sharing-list body entry are shown and identified (by number) below:

1: ccB0Mark Access head-side entry.
   1=>2: ccB1Mark Confirms deletion progress.
   2=>*3: sVoidHome2 Confirms completion.

Each line of this listing corresponds to a distinct packet transmission, where the first-line packet is sent first and triggers (directly or indirectly) the generation of packets listed on following lines. Each packet 165 is identified by its code 94 value, which effects how the packet is processed when received. The triggering event for each line (other than the first) is listed on the leftside of the line; for example, the '1=>' notation indicates the generation of this line-specified packet occurs after the receipt of the line-1 specified packet.

The '1=>' like notation identifies the dependencies for all but the final steps necessary to conclude the listed sequence. For compactness, these lines are preceded by a '*' character. While many sequences have only one '*' character on the last line, additional lines can have associated '*' characters when a request packet is are split into distinct parts, each of which can be forwarded/processed independently.

In this case, the initial ccB0Mark packet arrives at the tail-side neighbor, when the sRep queue 25 of cache responder 26 within the sharing-list tail is not-full and therefore capable of storing an additional request, as indicated by the white circle. This allows the tail-side station to forward the ccB1Mark directly to the body's head-side neighbor, as shown in line 2. That head-side neighbor returns the sVoidHome2 completion status, indicating the deletion has succeeded, i.e. the previous body entry is no longer listed within the sharing list and its cache line may be used for other purposes.

Referring now to FIG. 19b, a less efficient sharing-list body deletion-sequence scenario is shown and identified (by number) below.

1: ccB0Mark Access head-side entry.
   1=>2: sVoidMore Confirms completion.
   2=>3: ccB1Mark Confirms deletion progress.
   3=>*4: sVoidHome2 Confirms completion.

In this case, the initial ccB0Mark packet arrives a tail-side neighbor, when the sRep queue 25 of cache responder 26 within the sharing-list tail is full and therefore incapable of storing an additional request, as illustrated by the black circle. Thus, the tail-side station cannot forward the ccB1Mark directly to the body's head-side neighbor.

To resolve this dilemma, the ccB1Mark code is returned in the fCode field 103a of the returned response packet 89, and a sVoidMore value is placed in the code field 94g of that response packet. Processing of the returned line-2 causes the sharing-list body to send a request to the head-side neighbor, with the ccB1Mark value copied to the code field 94 location within the request packet 165.

That head-side neighbor returns the sVoidHome2 completion status, indicating the deletion has succeeded, i.e. the previous body entry is no longer listed within the sharing list and its cache line may be used for other purposes.

Referring now to FIG. 19c, the start of a rare least efficient sharing-list body deletion-sequence scenario is shown and identified (by number) below.

1: ccB0Mark Access head-side entry.
   1=>*2: sVoidNone2 Confirms data-access completion.

In this case, the initial ccB0Mark packet arrives a tail-side neighbor when the neighbor is busy performing other sharing-list updates (such as its own deletion from the sharing list)

that have precedence. Since the tail-side station cannot currently perform the requested actions, the request packet is simply consumed and an sVoidNone2-coded response packet is returned. That response deactivates the progress of the body-deletion sequence.

However, the pBack bit 139 within cache-line 137 is set to indicate the presence of the conflict within the sharing-list tail, as illustrated by the black rectangle. If the sharing-list tail completes its actions and maintains its sharing-list tail position (possibly after reading data from the preceding sharing-list entry), the pBack bit 139 within its cache-line 137 is checked. If this bit indicates a past conflict, then a ccPokeWake code value (listed in FIG. 10) is sent to the head-side entry. Upon receipt of its ccPokeWake-coded request, the body-deletion sequence is reactivated and continues as shown in FIG. 19a or FIG. 19b.

This form of confliction body-deletion increases the number of transmitted packets by two, but no more than two. A polling scheme (where the body periodically repeats its deletion attempts) could repeat for an indefinite number of times, until a tail-side conflict is forthcoming. Polling would have the undesirable effect of consuming additional power and reducing the effective system-interconnect bandwidth available to other attached entities.

Referring now to FIG. 19a, an efficient sequence for fetching data from a sharing-list tail entry is shown and identified (by number) below:

1: ccTnRead Access head-side neighbor.
1=>*2: sDataDone2 Confirms data-access completion.

In this case, the initial ccTnRead packet arrives at the head-side neighbor, when data is present within that neighbor's cache. The head-side neighbor supplies the data and needs not change its state, thus fulfilling the request without forcing the tail's removal from the list.

Referring now to FIG. 19b, a less efficient sequence for fetching data from a sharing-list tail entry is shown and identified (by number) below:

1: ccTnRead Access head-side neighbor.
1=>*2: sVoidHome2 Confirms completion.

In this case, the initial ccTnRead packet arrives at the head-side neighbor, when data is absent within that neighbor's cache. Since the head-side neighbor cannot supply the data, the request is processed as a deletion request by the sharing-list tail. The following sVoidHome2-coded response packet communicates the tail's deletion status, whereupon the previous sharing-list tail is free to acquire data is the normal manner, by initiating a memory access that results in its becoming a data-present sharing-list head.

This technique allows the old sharing-list tail to benefit from an unsuccessful read-from-neighbor data-fetch sequence, since a sharing-list deletion is normally the first step before accessing memory from a non-head sharing-list location.

Referring now to FIG. 21, sequences for converting a sharing list from modified to shared is shown. This technique is called washing and is invoked when only shared accesses attempt to access the previously modified cache-line address. The result of a successful washing sequence changes memory to the mS state; an unsuccessful washing sequence leaves memory in its original mM state. Washing can be unsuccessful if the affected line receives a nonsharing access during the wash operation.

Referring now to FIG. 21a, a conflict-free sharing-list washing sequence is illustrated; the packets involved in this sequence are listed below:

1: mSeRead Caching memory read.
1=>2: dnSwRead Shared coherent-cache washing read.
2=>*3: sVoidMore1 Confirms sharing completion.
2=>4: mTwRead0 Rinse that completes the washing.
4=>*5: sDataSMore0 Confirms completion.

The initial line-1 mSeRead request packet informs memory of the new requester. Memory discovers the line to be modified (and hence its data could be stale), so the line-2 dnSwRead request is sent to fetch the data from the current sharing-list head. The memory state is set to Ms, for the purpose of monitoring nonshared read accesses during this washing sequence. The line-3 sVoidMore1-coded response packet returns a partial completion, while the line-4 mTwRead0 request packet initiates a washing memory read.

Upon receiving the mTwRead0 request, the memory controller checks the memory line state. Because this state has not changed from its monitoring Ms state, washing is known to be successful. The memory state is then change to mS, which allows following shared accesses to be more efficiently dispatched. The sDataSMore0 response packet is returned to the new sharing-list head, forcing its data copy to remain in the read-only shared state.

Referring now to FIG. 21b, a conflicting sharing-list washing sequence is illustrated; the packets involved in this sequence are listed below:

1: mSeRead Caching memory read.
1=>2: dnSwRead Shared coherent-cache washing read.
2=>*3: sVoidMore1 Confirms sharing completion.
2=>4: mTwRead0 Rinse that completes the washing.
4=>*5: sDataMore0 Confirms completion.

The initial line-1 mSeRead request packet informs memory of the new requester. Memory discovers the line to be modified (and hence its data could be stale), so the line-2 dnSwRead request is sent to fetch the data from the current sharing-list head. The memory state is set to Ms, for the purpose of monitoring nonshared read accesses during this washing sequence. The line-3 sVoidMore1-coded response packet returns a partial completion.

Before the line-4 mTwRead0 request packet reaches memory, another processor sends a nonshared request (illustrated as item 10) and receives a modification-enabling response (illustrated as item 11). Having monitored this state change, memory changes its line state from Ms to Me.

Upon receiving the mTwRead0 request, the memory controller checks the memory line state. Because this state has changed to a conflict-indicating Ms state, washing is believed to be unsuccessful. The memory state is then restored to its mM state, and an sDataMore0 response packet is returned to the new sharing-list head, allowing its data copy to transition to a modifiable/shared dMh state.

Figure 22:
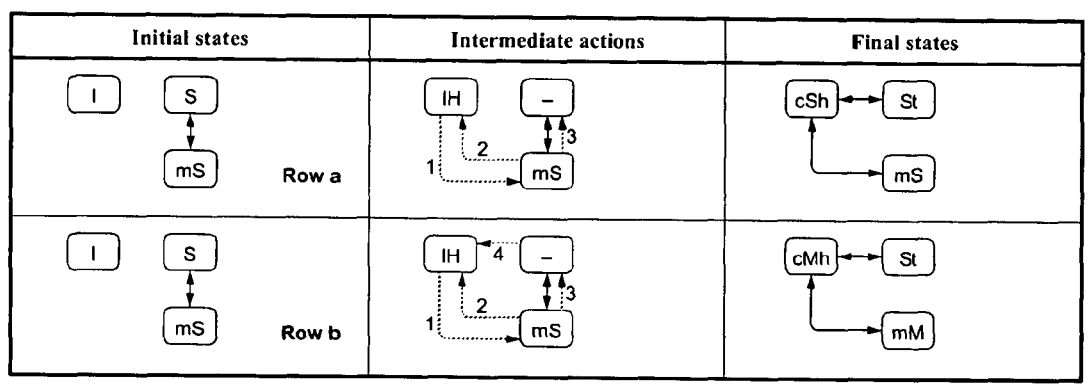
FIG. 22 illustrates the packet sequence for adding new entries to an existing shared-state sharing list.

Referring now to FIG. 22a, a shared memory access in the presence of a shared sharing-list is shown; the packets involved in this sequence are listed below:

1: mSsRead Caching memory read.
1=>*2: sDataSMore Provides early validated data.
1=>*3: dsSsPoke Previous-head directive.

Upon receiving the mSsRead request, the memory controller checks the memory line mState value 133. Because the data is known to be unmodified, memory generates an sDataSMore response to supply the requester with a copy of the memory resident data. A dsSsPoke request packet (a unconfirmed request that generates no response) is sent to the current sharing-list head, informing it of the new sharing list head. When this dsSsPoke-coded request is received at the old sharing-list head, its state changes from Sh to Sb, reflecting the change in the old sharing-list's position.

The new sharing-list head could attempt to update the old sharing-list entry, perhaps by invalidating its copy. Memory observes the distinction between the deXxMarkX-coded directives (generated by an existing sharing-list head) and the dxXxFetch-coded directives (generated by the next joining sharing-list head); these groups are listed in FIG. 9.

Any deXxMarkX group directives are thus known to be as premature, when its arrives before the expected dsSsPoke-coded packet. Rather than being accepted, a pBack bit 150 is set in the cache line 137 of the old sharing-list head and a rejected sVoidNone2-coded response packet is returned. When the expected dsSsPoke-coded request is eventually delivered, an sPokeWake-coded response packet is sent to wakeup the deactivated new sharing-list head.

Referring now to FIG. 22b, a modified memory access in the presence of a shared sharing-list is shown; the packets involved in this sequence are listed below:
1: mMcRead Caching memory read.
1=>*2: sDataMore0 Provides early validated data.
1=>3: dsSsMark1 Previous-head directive.
3=>*4: sVoidMore1 Confirms sharing completion.

Upon receiving the mSsRead request, the memory controller checks the memory line state. Because the data is known to be unmodified, memory generates an sDataMore0 response to supply the requester with a copy of the memory resident data. A dsSsMark1 request packet is accepted by the old sharing-list head and a sVoidMore1 packet is returned, thus allowing the new sharing-list to proceed with a cMh state.

The packets generated by a modified access are less efficient than those used to support a shared access, but are less frequently used and limit the number of corner-case timing conflicts to be considered.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for maintaining cache coherence using a distributed directory with event driven updates, the method comprising:
providing a plurality of cache-coherent multiprocessors, wherein the plurality of cache-coherent multiprocessors are connected via a system interconnect, wherein the system interconnect only supports directed request and response packet deliveries;
ensuring successful forwarding of a response packet is not dependent on any concurrently-active request packet;
providing a set of stable coherent cache states and a set of unstable coherent cache states for the plurality of cache-coherent multiprocessors;
in response to shared accesses attempting to access a previously modified cache-line address, converting a memory state from modified to shared by utilizing a washing technique;
avoiding the washing technique on any of infrequent read-only and mixed read/write accesses; and
avoiding deadlocks by placing to-be-executed command codes in returned response packets when request-forwarding queues are any of full and not present.

2. The method of claim 1, wherein the washing technique is unsuccessful if an affected line receives a nonsharing access during the washing technique.

3. The method of claim 1, wherein in a conflict-free sharing list, the washing technique comprises:
informing a memory of a new washing technique request;
discovering a line of the memory with stale data to be modified;
fetching the stale data from a current sharing-list head;
setting a state of the memory to a monitoring state (Ms) to monitor nonshared read accesses during the washing technique;
initiating the washing technique to change the state of the memory from a modified state (mM) to a shared state (mS); and
returning the response packets to a new sharing-list head to force a data copy of the new sharing-list head to remain in a read-only shared state.

4. The method of claim 1, wherein a set of possible stable coherence-list organization includes any of shared/shared1 (one entry), shared/shared2 (two entries), shared/sharedN (more than two entries), modifiable/shared1 (one entry), modifiable/shared2 (two entries), modifiable/sharedN (more than two entries), modifiable/exclusive1 (one entry), modifiable/modifiable2 (two entries), modifiable/modifiableN (more than two entries), modifiable/pairwise (two entries), modifiable/quidwise (more than two entries), modifiable/pairwise (two entries), and modifiable/quidwise (more than two entries).

5. The method of claim 1, wherein the set of stable coherent cache states includes any of invalid (I), shared (S), modifiable (M), exclusive (E), and null (N) states.

6. The method of claim 5, wherein the invalid (I) states include invalid—line is available, clean-data—fault has occurred, dirty-data—fault has occurred, and no-data—fault has occurred; the shared (S) states include clean-data shared only entry, no-data shared only entry, clean-data shared head entry, no-data shared head entry, clean-data shared body entry, no-data shared body entry, clean-data shared tail entry, no-data shared tail entry, clean-data shared pairwise entry, no-data shared pairwise entry, clean-data shared quidwise entry, and no-data shared quidwise entry; the modifiable (M) states include clean-data modifiable head entry, dirty-data modifiable head entry, no-data modifiable head entry, clean-data modifiable (head-side copy) quidwise entry, dirty-data modifiable (head-side copy) quidwise entry, and no-data modifiable (head-side copy) quidwise entry; the exclusive (E) states include clean-data exclusive only entry, dirty-data exclusive only entry, no-data exclusive only entry, dirty-data exclusive only entry, pairwise likely indication, clean-data exclusive (no copy) pairwise entry, dirty-data exclusive (no copy) pairwise entry, no-data exclusive (no copy) pairwise entry, clean-data exclusive (no copy) quidwise entry, dirty-data exclusive (no copy) quidwise entry, and no-data exclusive (no copy) quidwise entry; and the null (N) states include no-data unshared pairwise entry and no-data unshared quidwise entry.

7. The method of claim 1, wherein the set of unstable coherent cache states includes any of invalid (IX), shared-to-modifiable (SM), shared (SX), exclusive (E1), and null (N0) states.

8. The method of claim 7, wherein the invalid (IX) states include initial invalid-to-head access and initial invalid-to-body access; the shared-to-modifiable (SM) states include shared-to-modifiable upgrade (from body) and shared-to-modifiable upgrade (from tail); the shared (SX) states include dirty-data shared body (awaiting invalidation), dirty-data shared pairwise (awaiting touch), dirty-data shared quidwise (awaiting touch), dirty-data shared tail (awaiting invalidation), clean-data shared (toHead=1, tail copy), no-data shared (toHead=1, tail copy), clean-data shared (toHead=1, body copy), and no-data shared (toHead=1, body copy); the exclusive (E1) states include clean/exclusive (toHead=1, quidwise copy), dirty/exclusive (toHead=1, quidwise copy), and no-data/exclusive (toHead=1, quidwise copy); and the null (N0) states include dirty no-data only entry (awaiting deletion), dirty no-data pairwise entry (awaiting deletion), dirty no-data quidwise entry (awaiting deletion), and dirty no-data tail entry (awaiting deletion).

9. A system for maintaining cache coherence using a distributed directory with event driven updates, the system comprising a plurality of cache-coherent multiprocessors, wherein the plurality of cache-coherent multiprocessors are connected via a system interconnect, wherein the system interconnect only supports directed request and response packet deliveries, and a memory device coupled to the plurality of cache-coherent multiprocessors, wherein the memory device includes an application which, when executed by the plurality of cache-coherent multiprocessors, carries out the steps of:

ensuring successful forwarding of a response packet is not dependent on any concurrently-active request packet;

providing a set of stable coherent cache states and a set of unstable coherent cache states for the plurality of cache-coherent multiprocessors;

in response to shared accesses attempting to access a previously modified cache-line address, converting a memory state from modified to shared by utilizing a washing technique;

avoiding the washing technique on any of infrequent read-only and mixed read/write accesses; and avoiding deadlocks by placing to-be-executed command codes in returned response packets when request-forwarding queues are any of full and not present.

10. The system of claim 9, wherein in a conflict-free sharing list, the washing technique comprises:

informing a memory of a new washing technique request;

discovering a line of the memory with stale data to be modified;

fetching the stale data from a current sharing-list head;

setting a state of the memory to a monitoring state (Ms) to monitor nonshared read accesses during the washing technique;

initiating the washing technique to change the state of the memory from a modified state (mM) to a shared state (mS); and returning the response packets to a new sharing-list head to force a data copy of the new sharing-list head to remain in a read-only shared state.

* * * * *